United States Patent
Bradley et al.

(10) Patent No.: US 8,801,301 B2
(45) Date of Patent: Aug. 12, 2014

(54) SIMPLEX CONNECTORS FOR MULTICORE OPTICAL FIBER CABLES

(75) Inventors: Kelvin B. Bradley, Lawrenceville, GA (US); Gregory A. Sandels, Buford, GA (US); Willard C. White, Suwanee, GA (US)

(73) Assignee: OFS Fitel, LLC, Norcross, GA (US)

( * ) Notice: Subject to any disclaimer, the term of this patent is extended or adjusted under 35 U.S.C. 154(b) by 455 days.

(21) Appl. No.: 13/049,780

(22) Filed: Mar. 16, 2011

(65) Prior Publication Data

US 2011/0229085 A1  Sep. 22, 2011

Related U.S. Application Data

(60) Provisional application No. 61/314,165, filed on Mar. 16, 2010.

(51) Int. Cl.
*G02B 6/38* (2006.01)

(52) U.S. Cl.
USPC ............................... 385/78; 385/72

(58) Field of Classification Search
None
See application file for complete search history.

(56) References Cited

U.S. PATENT DOCUMENTS

| | | | |
|---|---|---|---|
| 5,631,986 A | 5/1997 | Frey et al. | |
| 5,682,451 A * | 10/1997 | Lee et al. | 385/78 |
| 6,264,372 B1 | 7/2001 | Pianciola et al. | |
| 6,287,018 B1 * | 9/2001 | Andrews et al. | 385/60 |
| 6,386,766 B1 * | 5/2002 | Lee | 385/56 |
| 6,663,293 B2 * | 12/2003 | Lampert et al. | 385/78 |
| 6,705,765 B2 * | 3/2004 | Lampert et al. | 385/77 |
| 7,052,188 B2 * | 5/2006 | Manning et al. | 385/78 |
| 7,147,384 B2 | 12/2006 | Hardcastle et al. | |
| 7,189,008 B2 * | 3/2007 | Dye | 385/78 |
| 7,548,674 B1 | 6/2009 | Horibe et al. | |
| 2002/0085815 A1 | 7/2002 | Shinagawa et al. | |
| 2004/0105625 A1 | 6/2004 | Ueda et al. | |
| 2005/0013549 A1 * | 1/2005 | Terakura | 385/78 |
| 2005/0201690 A1 | 9/2005 | Taira et al. | |
| 2005/0271328 A1 | 12/2005 | Ohtsu et al. | |
| 2009/0060421 A1 | 3/2009 | Parikh et al. | |
| 2009/0180734 A1 * | 7/2009 | Fiorentino et al. | 385/31 |

(Continued)

FOREIGN PATENT DOCUMENTS

| | | | |
|---|---|---|---|
| JP | S5612603 A | | 2/1981 |
| JP | 63-55505 A | * | 3/1988 |

(Continued)

*Primary Examiner* — Mike Stahl
(74) *Attorney, Agent, or Firm* — Jacobs & Kim LLP

(57) ABSTRACT

An optical fiber cable connector includes a ferrule subassembly, in which a ferrule is mounted into a receptacle including a barrel section having a flange at its base. The ferrule subassembly is loaded into an enclosure having a plug housing at its lead end. The plug housing is configured to provide a connection between an endface of a multicore fiber mounted into the ferrule and a corresponding surface in a mating socket. A collar is rotatably mounted onto the barrel section of the ferrule subassembly such that it butts up against the flange. The collar has an opening that fits around the barrel section, and an outer perimeter that fits into a receiving cavity with the plug housing. The ferrule, receptacle, receptacle barrel section, mounted multicore fiber, enclosure, and plug housing have a common longitudinal axis. As a result, the ferrule, receptacle, receptacle barrel section, and mounted multicore fiber are continuously rotatable with respect to the enclosure and plug housing, thereby enabling a precise rotational alignment of the multicore fiber within the enclosure.

23 Claims, 23 Drawing Sheets

(56) References Cited

U.S. PATENT DOCUMENTS

| | | |
|---|---|---|
| 2009/0185779 A1 | 7/2009 | Gurreri et al. |
| 2010/0290750 A1* | 11/2010 | Imamura ................ 385/126 |
| 2012/0251045 A1* | 10/2012 | Budd et al. .............. 385/33 |
| 2013/0044978 A1* | 2/2013 | DeDobbelaere et al. ....... 385/33 |

FOREIGN PATENT DOCUMENTS

| | | |
|---|---|---|
| JP | S6355505 A | 3/1988 |
| JP | 2003315614 A | 11/2003 |
| JP | 2006153939 A | 6/2006 |
| JP | 2010-286548 A * | 12/2010 |

* cited by examiner

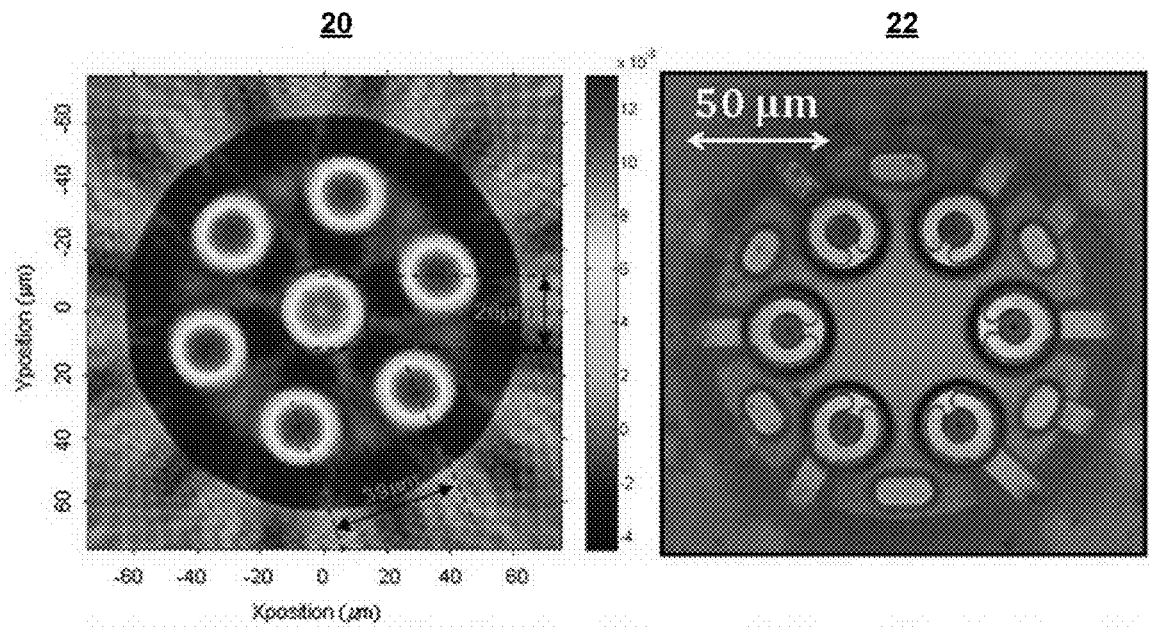
FIG. 2A  FIG. 2B
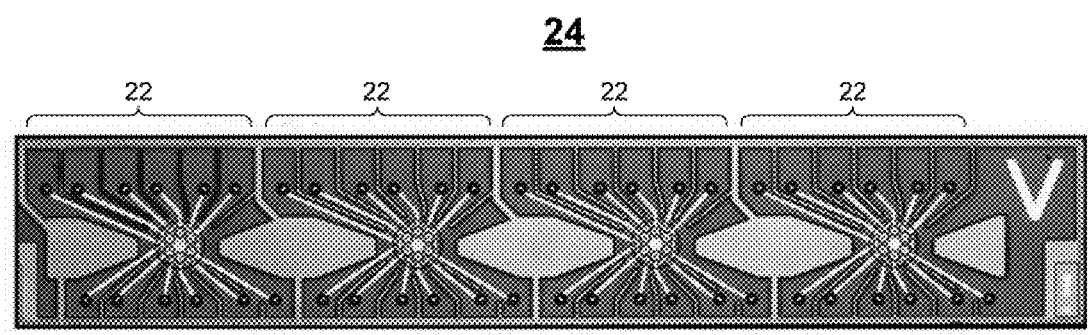
FIG. 2C

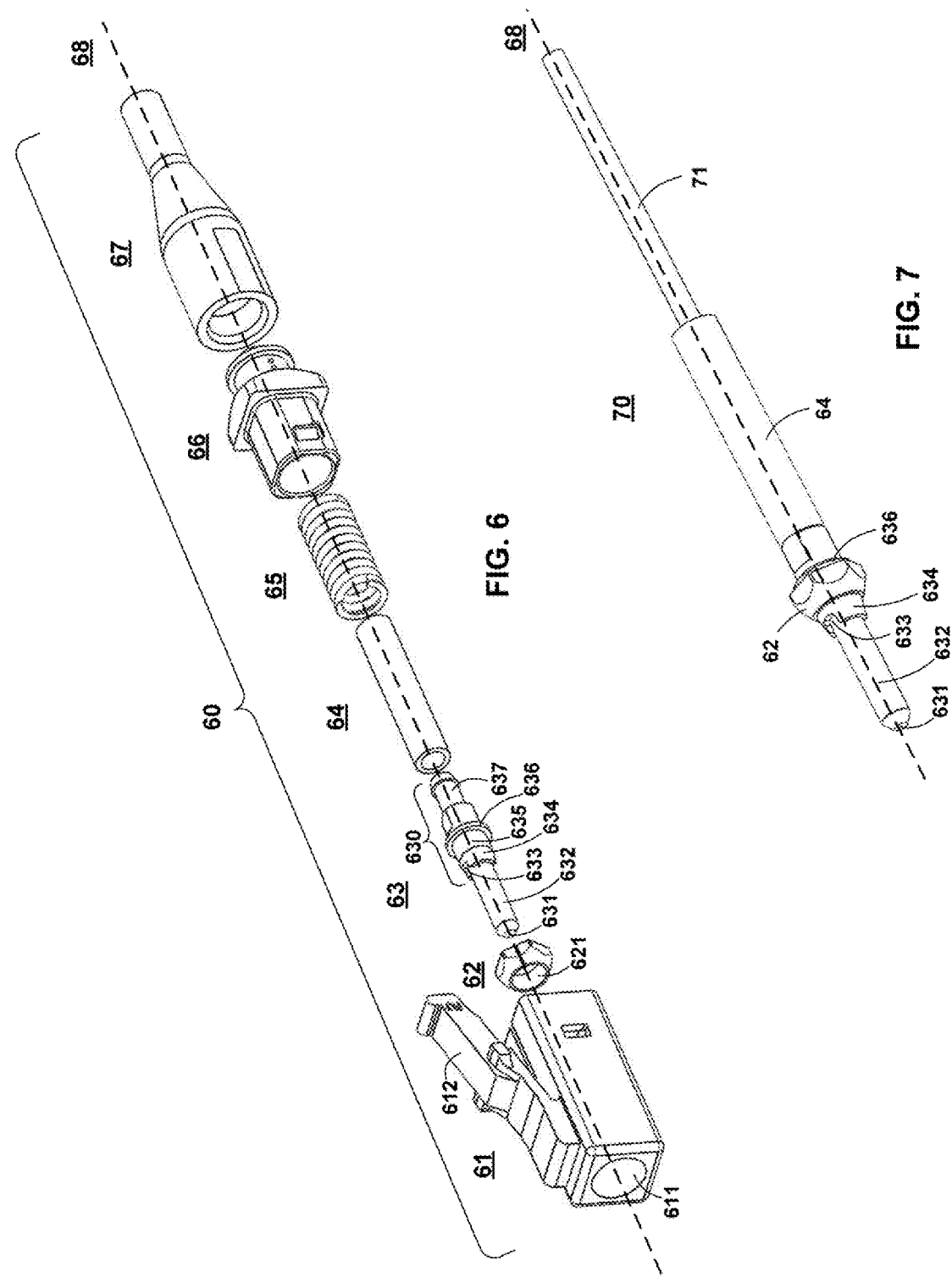

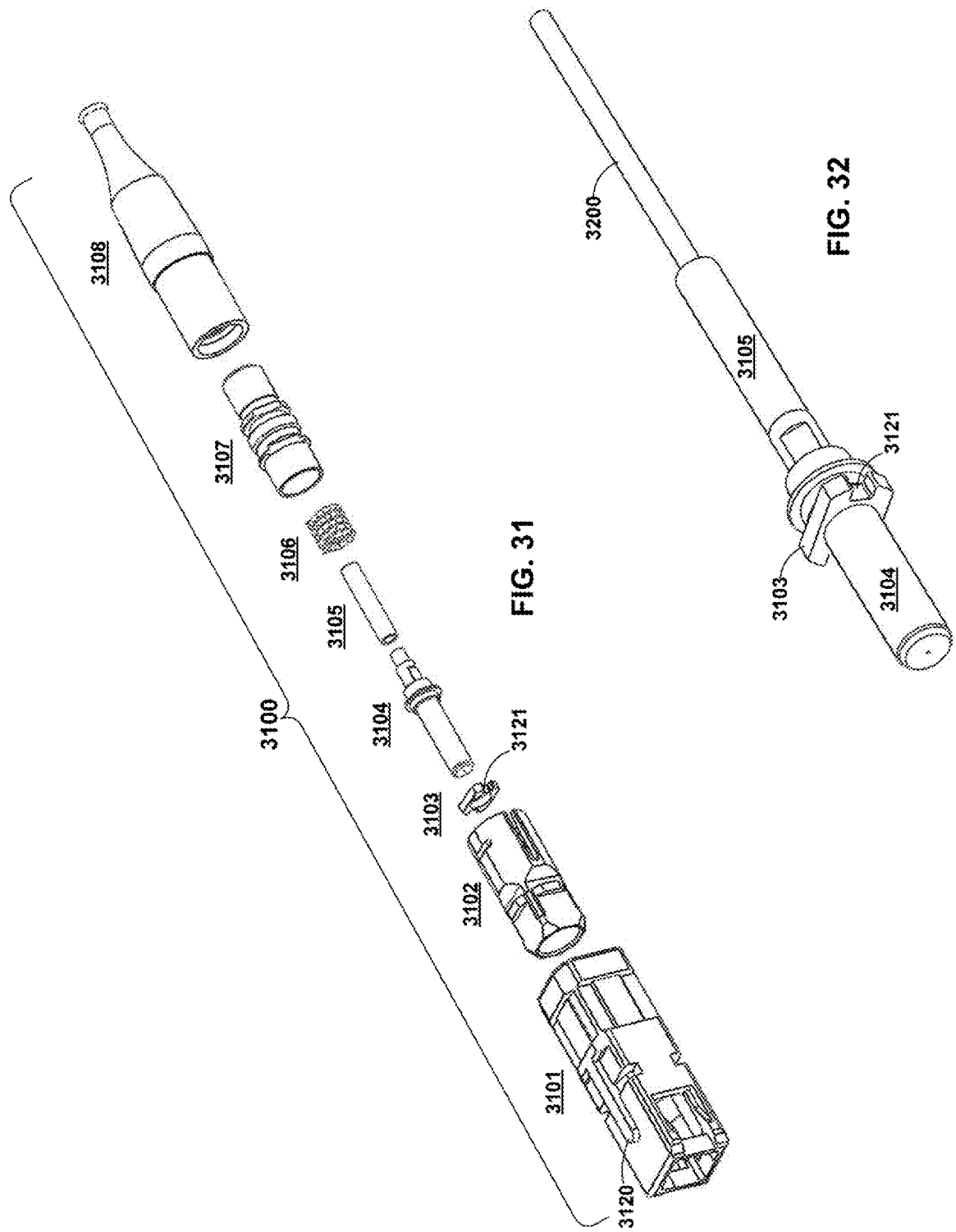

US 8,801,301 B2

SIMPLEX CONNECTORS FOR MULTICORE OPTICAL FIBER CABLES

CROSS REFERENCE TO RELATED APPLICATIONS

The present application claims the priority benefit of the following United States provisional patent applications, which are owned by the assignee of the present application, and which are incorporated herein by reference in their entirety:

U.S. Prov. Pat. App. Ser. No. 61/314,165, filed on Mar. 16, 2010.

BACKGROUND OF THE INVENTION

1. Field of the Invention

The present invention relates generally to the field of fiber optics, and in particular to improved simplex connectors for multicore optical fiber cables.

2. Background Art

The ever increasing demand for high-density, high-speed parallel optical data links, for super-computer and data-center applications, has spawned significant interest in passive optical devices designed to facilitate reliable, cost-effective deployment. In multi-channel parallel links for super computers and data centers, thousands of optical links, operating at 1 Gb/s to 10 Kb/s, may be utilized.

In conventional configurations, one-dimensional parallel optical links typically utilize a 1×12 multimode linear array of fibers, with each fiber serving as a separate channel. In this arrangement, the fibers, which are typically on a 250-µm pitch within a ribbon, are terminated into a molded multi-fiber ferrule, such as an MT ferrule. The MT-terminated fibers are then used to make connections between multi-channel VSCEL and PiN photodetector arrays. For applications requiring a more rugged assembly, jacketed fibers, typically in a ribbon configuration, are terminated within MT ferrules that are then placed inside MT-RJ, MPO, MTP™, or MPX Connector Housings, to produce robust patch cords.

MT ferrules are available in numerous sizes with various hole counts, to address a wide range of connector and signal routing applications. For example, the mini MT2 and mini MT4 are used in MT-RJ patch cords. The MT4, MT8, and MT12 are used in one-dimensional array MPO and MPX patch cords.

For even higher densities, manufacturers terminate fibers into 2D-array MT16, MT24, MT48, MT60, or MT72 ferrules. However, high-density configurations assembled using standard single-core fibers have proven to be extremely expensive to produce, since achieving physical contact between all of the fibers, when two connectors are mated, requires very precise control of the polishing process to ensure coplanarity (especially in the 72-fiber variant). Also, the molded MT ferrules are very expensive to produce. The production yields on 2D-array MT ferrules leads to significantly higher cost, as one hole out of position causes a ferrule to be rejected. For instance, if a 72-fiber ferrule has one hole that doesn't meet positional requirements, then the ferrule is discarded even though there are 71 correctly positioned holes.

In addition, stacking fiber ribbons to produce the ribbon cordages, needed for the 2D configurations, leads to a relatively large, bulky, and expensive package. Also, the flexibility of the ribbon cordage is adversely affected.

SUMMARY OF THE INVENTION

An aspect of the invention provides an optical fiber cable connector. In a ferrule subassembly, a ferrule is mounted into a receptacle including a barrel section having a flange at its base. The ferrule subassembly is loaded into an enclosure having a plug housing at its lead end. The plug housing is configured to provide a connection between an endface of a multicore fiber, mounted into the ferrule, and an optical transmission device having a mating socket. Alternately, the multicore fiber could be connected to another multicore fiber, via a pass-through adapter, with connectors installed into opposing ends of the adapter. A collar is rotatably mounted onto the barrel section of the ferrule subassembly such that it butts up against the flange. The collar has an opening that fits around the barrel section, and an outer perimeter that fits into a receiving cavity within the plug housing. The ferrule, receptacle, receptacle barrel section, mounted multicore fiber, enclosure, and plug housing have a common longitudinal axis. As a result, the ferrule, receptacle, receptacle barrel section, and mounted multicore fiber are continuously rotatable with respect to the enclosure and plug housing, thereby enabling a precise rotational alignment of the multicore fiber within the enclosure.

Further aspects of the invention are directed to connectors in which a ferrule subassembly is loaded into a rotatable frame, and in which a flange extension member and an extender are used to control the rotational alignment of a multicore fiber within an enclosure.

BRIEF DESCRIPTION OF THE DRAWINGS

FIG. 2A shows a tomographic refractive index profile of the 7-core MCF shown in FIGS. 1A and 1B.

FIG. 2B shows an image of a hexagonally arranged VCSEL array that can be used to interface with the outer six cores of the MCF shown in FIGS. 1A and 1B.

FIG. 2C shows an image of a transmitter subassembly, comprising four side-by-side VCSEL arrays of the type shown in FIG. 2B.

FIG. 6 shows an exploded view of a BTW LC connector, according to an aspect of the invention, in which a rotatable collar is used to provide continuous rotational alignment of a multicore fiber mounted to the connector.

FIG. 7 shows a close-up view of a rotatable ferrule subassembly, as used in the FIG. 6 connector.

FIG. 31 shows an exploded view of a BTW SC connector, according to an aspect of the invention, wherein a rotatable collar is used to provide rotational alignment of a multicore fiber mounted to the connector.

FIG. 32 shows a close-up view of the ferrule subassembly from the FIG. 31 connector, installed onto a buffered fiber.

DETAILED DESCRIPTION

Aspects of the invention are directed to simplex (i.e., single-fiber) connectors for use with single-mode and multi-mode multicore fibers. As discussed below, a connector of the type described herein is mounted to the end of a multicore fiber cable. The connector provides plug-in connectivity between the multicore fiber cable and an optical transmission device having a mating socket. When the connector is plugged into the socket, an endface of the cabled multicore fiber is urged against a corresponding surface within the socket. Alternately, the multicore fiber could be connected to another multicore fiber, via a pass-through adapter, with connectors installed into opposing ends of the adapter.

One application for simplex connectors of the type described herein is in a multi-channel transmission system, in which segments of multicore fiber are butt-coupled with specially designed 2-dimensional VCSEL and PiN photo detector arrays to facilitate simultaneous transmission over several cores, within each fiber. Such a transmission system is described in U.S. Prov. Pat. App. Ser. No. 61/314,184, filed on Mar. 16, 2010, which is owned by the assignee of the present application, and which is incorporated herein by reference in its entirety.

Figure 1A:
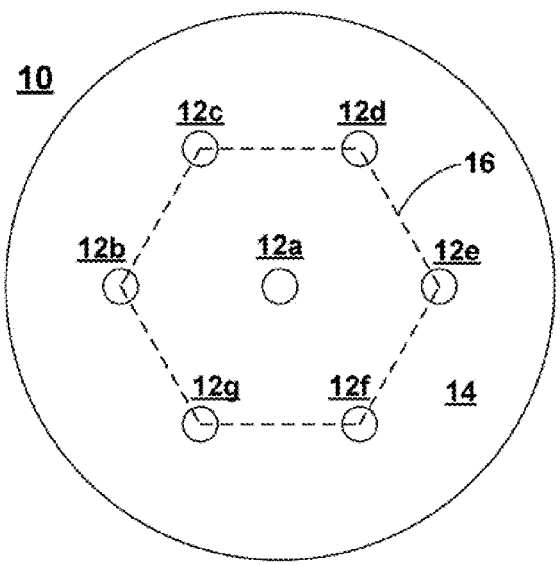
FIGS. 1A and 1B show, respectively, cross section and isometric diagrams of an exemplary 7-core multicore fiber (MCF) design described in a co-pending patent application owned by the assignee of the present application.
Figure 1B:
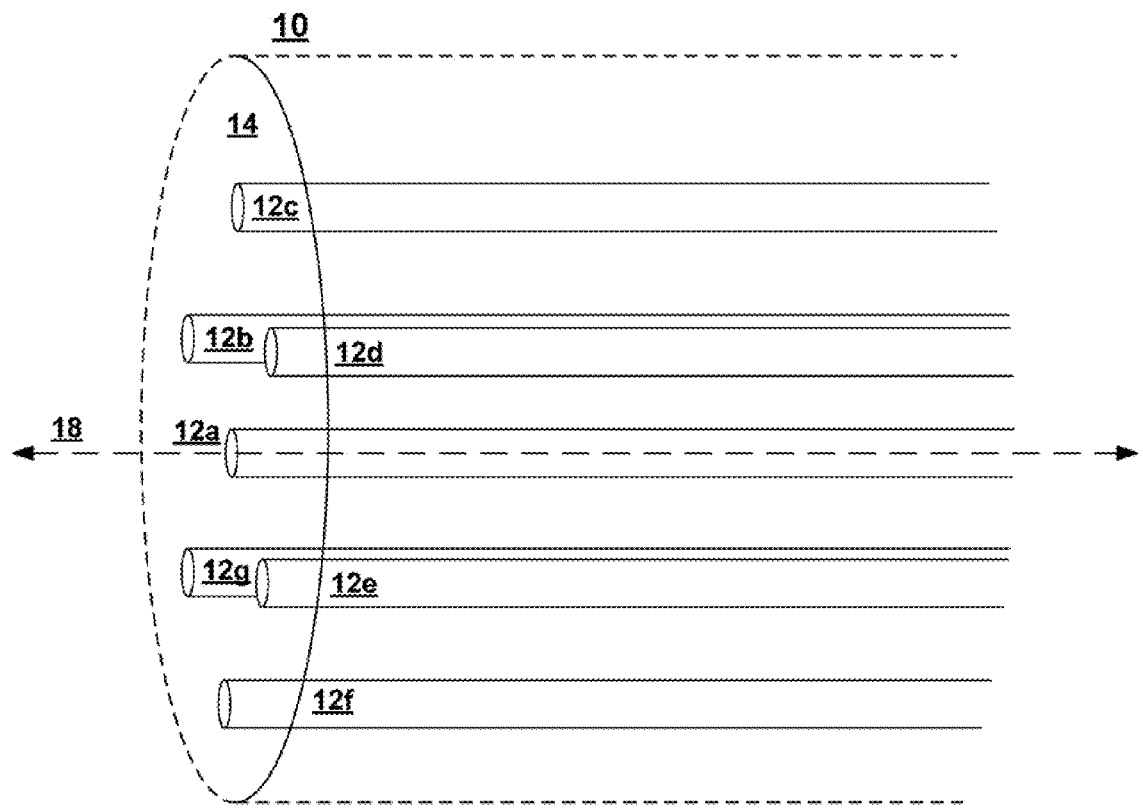

FIGS. 1A and 1B show, respectively, cross section and isometric diagrams of an exemplary 7-core MCF 10, described in U.S. Prov. Pat. App. Ser. No. 61/314,181, filed on Mar. 16, 2010, which is owned by the assignee of the present application, and which is incorporated herein by reference in its entirety. MCF 10 comprises an array of seven core regions 12a-g within a common cladding region 14. A first core region 12a is located at the center of the fiber. Six of the core regions 12b-g are arranged as a hexagon 16 surrounding central core 12a. The seven core regions 12a-g are configured to carry respective light transmissions down the length of MCF 10 along a longitudinal axis 18 thereof.

MCF 10 is fabricated, using a stack-and-draw technique, from seven graded-index LaserWave fiber core rods arranged in a hexagonal array. The drawn fiber has 26-µm core diameters, a 39-µm core-to-core pitch, and a circular outer cladding having a diameter of 125 µm, which is compatible with conventional optical connectivity products. It will be appreciated that the present description of aspect of the invention is also applicable to single-mode multicore fibers, as well as to multicore fibers having different outer diameters and outer cladding shapes. For example, while the outer cladding shown in FIGS. 1A-1B has a circular cross section, the structures and techniques described herein could also be used in conjunction with fibers having elliptical cross sections. (Indeed, a circle can be viewed as a special case of an elliptical geometry.)

FIG. 2A shows a tomographic refractive index profile 20 of the 7-core MCF 10. FIG. 2B shows an image of a hexagonally arranged VCSEL array 22 that can be used to interface with the outer six cores of the MCF. FIG. 2C shows an image of a transmitter subassembly 24, comprising four side-by-side VCSEL arrays 22, each array comprising six VCSELs. Such a device could be used to transmit through the six outer cores of a 7-core multicore fiber. Of course, other core counts and VCSEL configurations are possible, e.g., 2×2, etc.

According to an aspect of the invention, described below, a multicore fiber is terminated within the cylindrical ferrule of a simplex connector, such as an LC, FC, MU. ST, or SC connector, or the like. Using a 2-dimensional VCSEL array, such as array 22 shown in FIG. 2B, it is possible to realize parallel transmission down multiple channels in the same space required to conduct single-channel transmissions via a conventional single-core fiber. Of course, since multicore fibers with any number of cores can be produced, multicore connectors with various channel counts are possible.

In order to facilitate signal transmission, each core in the simplex connector has to be precisely aligned with a corresponding VCSEL of an active device. For mated connectors, the corresponding cores (i.e. transmission paths) of the multicore fiber must terminate at precisely aligned locations within the opposing connector.

Aspects of the invention are directed to multicore fiber connectors that facilitate core-to-device and core-to-core alignment. As described below, a connector system according to an aspect of the invention provides continuous rotational alignment of a multicore fiber with respect to a second element by providing a ferrule frame assembly in which an end of the multicore fiber is rotatably mounted. According to a further aspect of the invention, after alignment, the rotational orientation of the multicore fiber is then fixed relative to the ferrule axis. Rotational alignment structures according to aspects of the invention are described in the context of LC-type and SC-type connectors. Both behind-the-wall (BTW) and jumper (i.e., patch cord) variants are presented.

The optical performance of a connection between mated multicore connectors depends, in large part, on the accuracy with which the corresponding cores of the two multicore fiber endfaces are aligned. A number of conditions affect the alignment of the multicore fiber endfaces, including lateral offset, angular offset, and longitudinal offset.

Contributing factors to lateral and angular offset include: ferrule outside diameter tolerances, ferrule-capillary concentricity relative to the ferrule outside diameter, ferrule-capillary angularity relative to the ferrule outside diameter, fiber diameter to ferrule-capillary clearance, fiber core positional error, and core orientation relative to connector keying features. These factors are addressed via tight dimensional control of the ferrule and fiber geometries, and the application of the rotatable connector components and associated structures and techniques described herein.

Longitudinal offset between the multicore fiber cores is influenced by a number of factors, including: axial force on the multicore fiber endfaces (e.g., due to spring-loading), radius of curvature of the ferrules, apex offset of the spherical ferrule endfaces, and fiber protrusion or undercut from the ferrule endfaces. To ensure that all cores of the mated multicore connectors physically contact, assuming rotational alignment has been achieved, it is imperative that both the ferrule contact force and endface geometry of the connectors be controlled.

After polishing, the multicore fibers will have a convex shape; therefore, the contact force must be sufficient to mate the cores with some minimal force. The radius of curvature of the ferrule endfaces should typically be greater than 7 mm, the fiber protrusion should typically range from −0.125 μm to +4.0 μm, the apex offset of the endface should typically be less than 70 μm, and the contact force on the ferrules should be greater than 4.1 N, to ensure core-to-core contact is maintained during operation.

For the purposes of the present discussion, it is assumed that the described connectors are used in conjunction with an optical fiber cable containing a single multicore fiber. However, it will be apparent that the described structures and techniques may also be used in conjunction with optical fiber cable containing a plurality of fibers and fiber types.

It will be appreciated that the present examples of various practices of the invention are illustrative, rather than limiting, and that the described structures and techniques may be applied, with suitable modification as needed, to other types of optical fiber cables and connectors.

The description of aspects of the invention is organized into the following sections, in which a number of different practices of the invention are presented:
  1. Multicore Simplex Connectors: LC-Type
  1.1 Prior-Art LC Connectors
  1.2. LC Connector with Rotatable Flange Collar
    1.2.1. Polygonal-Shaped Collar
    1.2.2. Other Collar Geometries
  1.3. LC Connector with Rotatable Frame
    1.3.1. Rotatable Frame with Front-End Press-Fit Retainer
    1.3.2. Rotatable Frame with Bayonet-Style Retainer
    1.3.3. Rotatable Frame with Rear-End Press-Fit Retainer
  1.4. LC Connector with Extended Flange
  2. Multicore Simplex Connectors: SC-Type
  2.1. Prior-Art SC Connectors
  2.2. SC Connector with Rotatable Flange Collar
    2.2.1. Collar with Keyways or Keys
    2.2.2. Other Collar Geometries
  2.3. SC Connector with Rotatable Cable Retention Member
    2.3.1. Rotatable Retention Member with Keys
  3. Techniques
  4. Conclusion 1. Multicore Simplex Connector LC-Type 1.1. Prior-Art LC Connectors Section 1.1 has been included in order to provide context for the sections that follow.

Generally speaking, an optical fiber connector is a mechanical device that is mounted to an end of an optical fiber cable in order to provide an easy way to connect the cable end to, and disconnect the cable end from, a device having a suitably shaped socket.

The mounting of a connector to the end of an optical fiber cable is a multistep process. First, an end of the optical fiber cable is prepared by stripping away the outer protective layers to expose a length of bare optical fiber. The bare fiber is then threaded down the length of a capillary extending longitudinally through a ferrule subassembly, with the end of the bare fiber positioned at the tip of the ferrule.

The ferrule subassembly is loaded into a plug housing, which is shaped to "snap" into a suitably shaped socket, bringing the optical fiber endface at the ferrule tip into operational proximity to a corresponding surface contained within the socket (such as, for example, the above-described array of optical devices) or into direct contact with the optical fiber endface of another connector.

Figures 3, 4, 5:
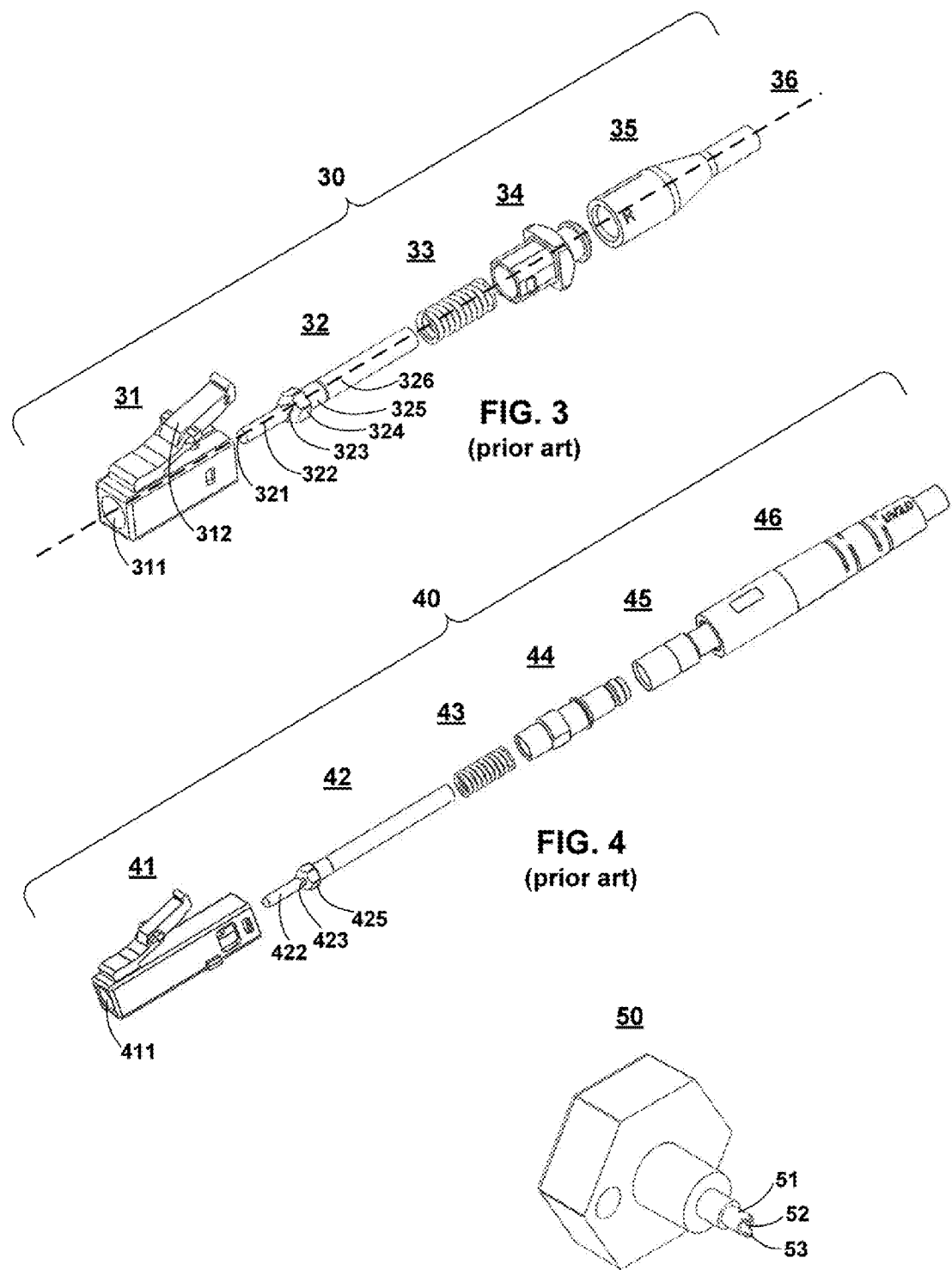
FIG. 3 shows an exploded view of a behind-the-wall (BTW) LC connector according to the prior art.
FIG. 4 shows an exploded view of a jumper LC connector according to the prior art.
FIG. 5 shows a perspective view of a tuning wrench of a type suitable for use in conjunction with the connectors shown in FIGS. 3 and 4.

FIG. 3 shows an exploded view of a behind-the-wall (BTW) LC connector according to the prior art. LC connector 30 comprises the following components, from left to right: plug housing 31; ferrule subassembly 32; spring 33; extender 34; and buffer boot 35. For the purposes of the present discussion, the adjectives "front" and "lead" refer to the plug end of a connector (i.e., the left side of FIG. 3). The adjectives "rear" and "tail" refer to the boot end of a connector (i.e. the right side of FIG. 3).

Components 31-35 Share a Common Longitudinal Axis 36.

In the assembled connector 30, the ferrule subassembly 32, the cable end mounted thereto, "floats" along longitudinal axis 36 within an enclosure comprising plug housing 31, extender 34, and buffer boot 35. Spring 33 provides spring-loading of the ferrule subassembly 32 within the enclosure, such that the ferrule-flange assembly 32 is biased toward the front end of plug housing 31. Boot 35 relieves mechanical strain on the optical fiber cable.

Ferrule subassembly 32 includes a ferrule 322, a receptacle 325, and tubing 326. The ferrule 322 has a precision hole extending down its length along axis 36. The hole is shaped to closely receive a bare optical fiber from a stripped end of an optical fiber cable (not shown). The bare fiber is trimmed at the ferrule tip 321 and polished, resulting in an exposed fiber endface having a convex perimeter. Receptacle 325 includes a hexagonal flange 324 having a pair of slots 323 in its perimeter.

When connector 30 is fully assembled, the ferrule tip 324 is accessible through an opening 311 at the front of the plug housing 31. The plug housing 31 includes a latch arm 312 that is used to releasably lock the connector into a corresponding socket (not shown).

When connector 30 is fully assembled, the hexagonal flange 324 is seated in a corresponding hexagonal cavity within plug housing 31, thereby preventing rotation of the flange/ferrule assembly 32 around axis 36.

FIG. 4 shows an exploded view of a jumper LC connector 40 according to the prior art. LC connector 40 comprises the following elements, from left to right: plug housing 41, ferrule subassembly 42; spring 43, cable retention member 44; crimp/sleeve subassembly 45; and strain-relief boot 46. It will be seen that the components of jumper LC connector 40 generally correspond to the components of BTW LC connector 30, shown in FIG. 1. In particular, it will be seen that the above description of the elements of plug housing 31 and ferrule subassembly 32 in BTW LC connector 30 apply equally to plug housing 41 and ferrule subassembly 42 in jumper LC connector 40.

FIG. 5 shows a perspective view of a tuning wrench 50 that can be used to rotate the ferrule subassembly 32, 42 around its longitudinal axis in an assembled connector 30, 40, in order to improve core alignment. As shown in FIG. 5, tuning wrench 50 includes a hollow shaft 51 having an opening 52 therein that fits through the plug housing opening 311, 411, and around the ferrule 322.422. Teeth 53 engage flange slots 323.423.

In use, tuning wrench 50 pushes the ferrule subassembly 32, 42 along its longitudinal axis toward the tail end of the assembled connector 30, 40, such that spring 33, 43 is depressed, and such that hexagonal flange 325, 425 is unseated from its receiving cavity in plug housing 31, 41. Once the flange 325, 425 is unseated, the ferrule subassembly 32, 42 can then be freely rotated around its longitudinal axis. Releasing the tuning wrench 50 causes the hexagonal flange 325, 425 to be reseated in its receiving cavity. It will be appreciated that the ferrule subassembly 32, 42 can be only rotated to one of six orientations (i.e. 60-degree positional tuning) relative to the plug housing 31, 41, corresponding to the six possible rotations of the flange 325, 425 within its corresponding hexagonal cavity.

1.2. LC Connector with Rotatable Flange Collar 1.2.1. Polygonal-Shaped Rotatable Flange Collar FIG. 6 shows an exploded view of a BTW LC connector 60 according to an aspect of the invention. Connector 60 comprises the following components (from left to right): plug housing 61 with opening 611 and latch arm 612; rotatable flange collar 62; ferrule subassembly 63; tubing 64; spring 65; extender 66; and buffer boot 67.

Components 61-67 Share a Common Longitudinal Axis 68.

Ferrule subassembly 63 comprises ferrule 632, which is mounted into the front end of receptacle 630. Ferrule 632 includes a precision hole along longitudinal axis 68. This hole is dimensioned to closely receive a bare optical fiber from a stripped end of an optical cable.

Receptacle 630 includes a tapered lead end 634 with an opening therein into which ferrule 632 is seated, and a plurality of slots 633, which are configured to be engaged by a tuning wrench of the type shown in FIG. 5. Receptacle 630 further includes a cylindrical barrel section 635 and a flange 636.

Figure 9:
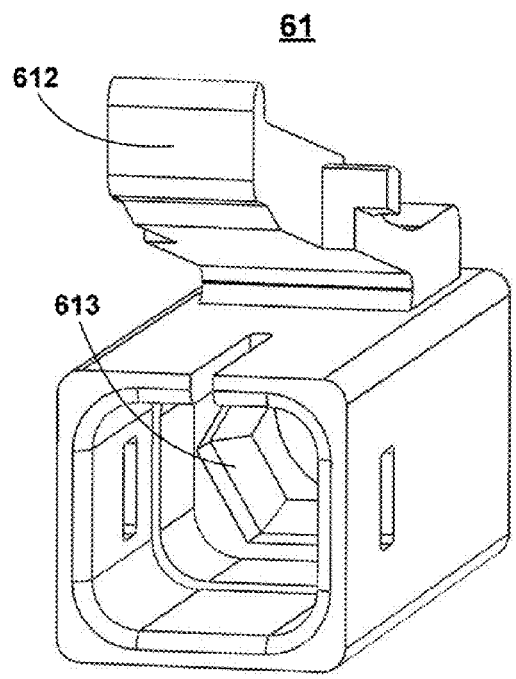
FIG. 9 shows a rear perspective view of the plug housing of the FIG. 6 connector.

Collar 62 has an opening therein 621 that is dimensioned to fit closely around barrel section 635, while allowing ferrule subassembly 63 to be rotated within collar opening 621, around longitudinal axis 68. In the assembled connector 60, collar 62 butts up against flange 636. In addition, in the assembled connector 60, collar 62 is seated into a correspondingly shaped cavity within plug housing 61. An example of such a cavity is shown in FIG. 9, discussed below. Thus, collar 62 provides a mechanical interface between the ferrule subassembly 63 and the plug housing 61.

FIG. 7 shows a close-up view of an assembled ferrule subassembly 70, comprising collar 62, ferrule subassembly 63, tubing 64, and an installed buffered multicore fiber 71. From FIG. 7, it can be seen that when assembled, ferrule 632 and tapered lead end 634 of receptacle 630, including slots 633, protrude through the opening in collar 62. In accordance with the above discussion, the outer layers of fiber 71 are stripped away to expose a bare multicore fiber that is threaded through a precision hole in ferrule 632 and held in position using epoxy or other suitable adhesive. The end of the fiber is trimmed and polished to create a convex fiber endface at ferrule tip 631.

Figure 8:
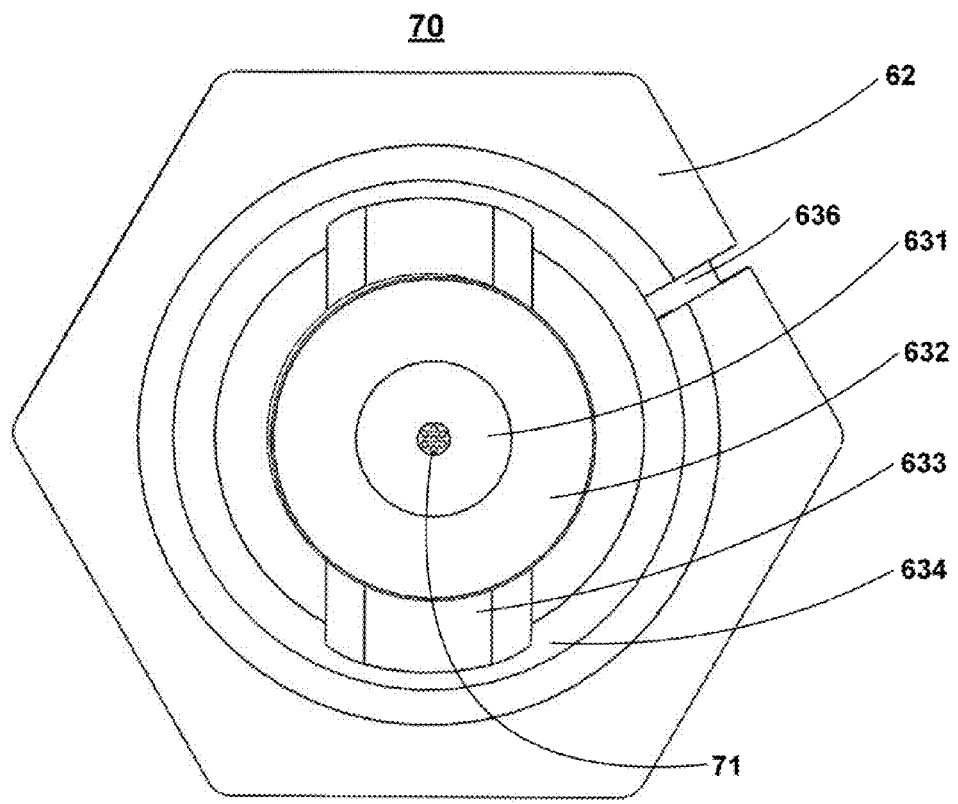
FIG. 8 shows an end view of the rotatable ferrule subassembly shown in FIG. 7.

Once the fiber is terminated and polished, the collar 62 can be rotated relative to assembly 63, to allow the cores of the multicore fiber to be aligned in the desired orientation. FIG. 8 shows an end view of assembled ferrule subassembly 70, in which the collar 62 is positioned so that a particular core of fiber 71 is directly adjacent to one of the flat sides of the hexagonal collar 62.

In one scenario, the hex collar 62 is held fixed in a fixture while the ferrule subassembly 63 is rotated within the collar 62. Once the collar 62 is in the desired position relative to the ferrule subassembly 63, it can be held in position with epoxy or other suitable adhesive. Alternatively, the collar 62 can be configured to provide a light press fit onto the flange barrel section 635, which would inhibit rotation after orientation. Once the flange collar 62 is oriented, the flange/ferrule assembly can be installed into the connector plug housing 61.

FIG. 9 shows a rear perspective view of plug housing 61, the interior of which includes a tightly toleranced internal hexagonal cavity 613. The hex collar 62 holds the ferrule subassembly 63 in the desired orientation, relative to the connector cantilever latch 612 located on the top of the housing 61.

Alternatively, the ferrule subassembly 63 and the other connector components (i.e. housing, spring, extender, etc.) can be fully assembled and a special LC tuning wrench, like that shown previously in FIG. 5, could be used to orient the ferrule subassembly 63 relative to the collar 62. The tuning wrench engages slots 633 and allows the user to rotate the ferrule flange barrel relative to the hex collar (and housing).

Figure 10:
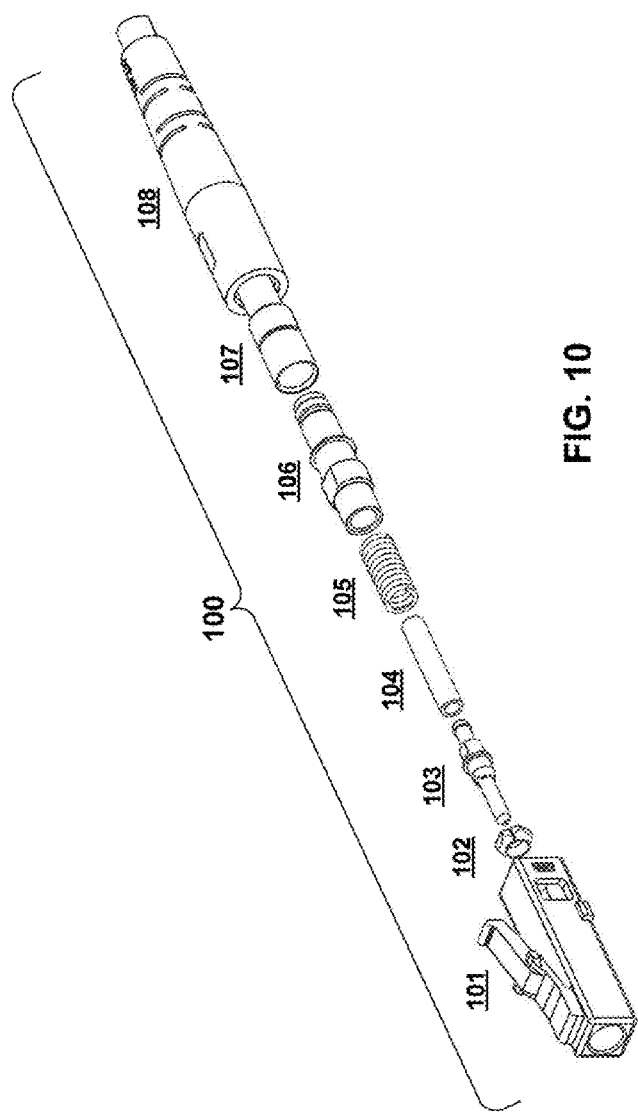
FIG. 10 shows a jumper LC connector, according to a further aspect of the invention.

FIG. 10 shows the jumper LC connector 100 employing the above-described structures. LC connector 100 comprises the following elements, from left to right: plug housing 101; rotatable collar 102; ferrule subassembly 103; tubing 104; spring 105, cable retention member 106; crimp/sleeve subassembly 107; and strain-relief boot 108.

The above-described orientation techniques with respect to BTW connector 60 (FIG. 6) are equally applicable to jumper connector 100. Jumper components (i.e. cable-retention member 106, crimp-sleeve subassembly 107, and strain-relief boot 108) are used in place of their BTW counterparts.

1.2.2. Other Collar Geometries

Figure 11A:
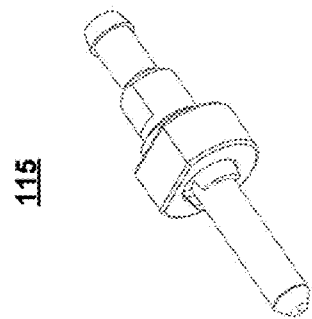
FIGS. 11A-11B contains examples of alternative geometries for a rotatable collar suitable for use in the connectors shown in FIGS. 6 and 10.
Figure 11B:
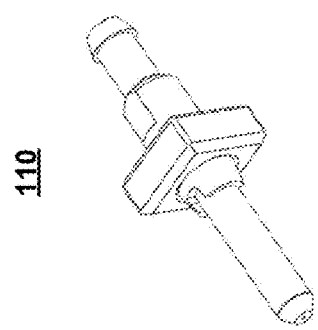

Other collar geometries are also feasible. The hexagonal shape is just one of many possible polygonal shapes, including, for example, square, rectangular, triangular, and the like. The rotatable collar could also be D-shaped or double-D shaped. The internal geometry of the plug housing would be changed to match the collar geometry. FIGS. 11A-11B contains examples of alternate collar geometries 110, 115.

Figure 12:
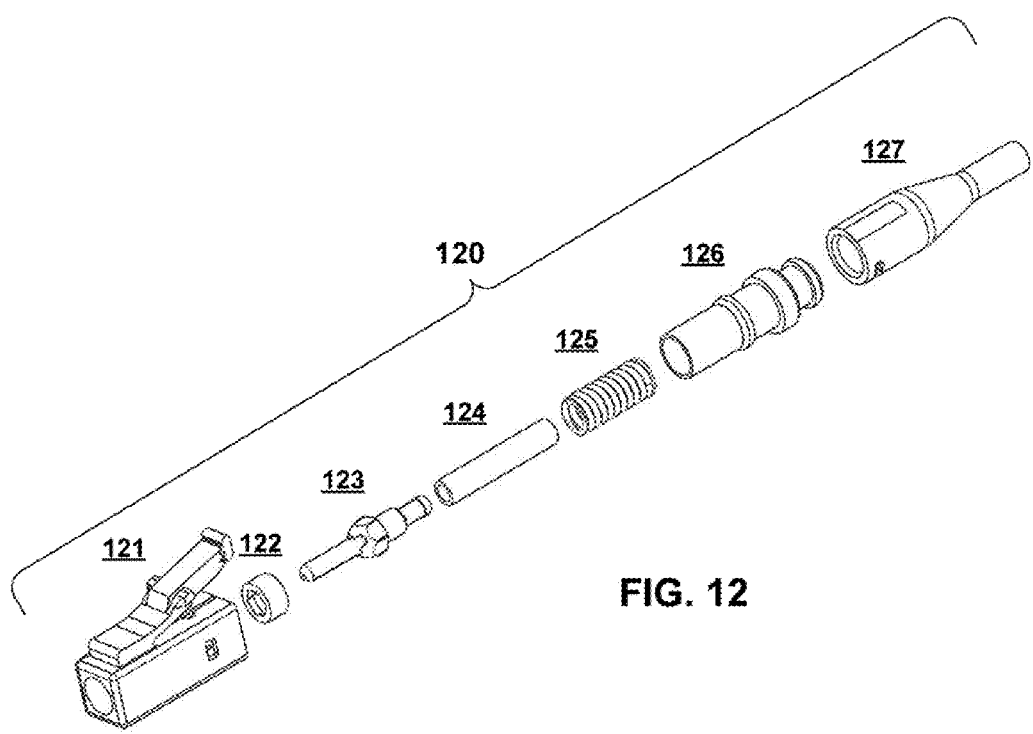
FIG. 12 contains an exploded view of a BTW LC connector according to a further aspect of the invention, in which a ferrule subassembly is housed within a frame that is rotatable as a unit within the assembled connector.

1.3. LC Connector with Rotatable Frame 13.1. Rotatable Frame with Front-End Press-Fit Retainer FIG. 12 contains an exploded view of a BTW LC connector 120 according to a further aspect of the invention, in which a ferrule subassembly is housed within a frame that is rotatable as a unit within the assembled connector. Connector includes the following elements (left to right): plug housing 121; retainer 122; ferrule subassembly 123; tubing 124; spring 125; rotatable frame 126; and buffer boot 127. Frame 126 has a substantially cylindrical shape, and has a cavity therein shaped to receive the ferrule subassembly 123.

Figure 13:
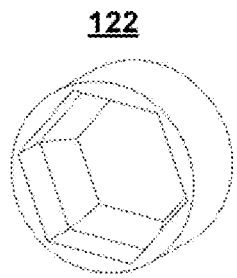
FIG. 13 shows a close-up view of a retainer element, as used in the FIG. 12 connector.

FIG. 13 shows a close-up view of a retainer 122, which is press-fit into the mouth of frame 126 to retain the ferrule subassembly 123, tubing 124, and spring 125 within the frame 126. The retainer has an internal geometry (e.g. hex, square, rectangular, D, double-D, etc.) which matches the shape of the ferrule subassembly 123.

Figure 14:
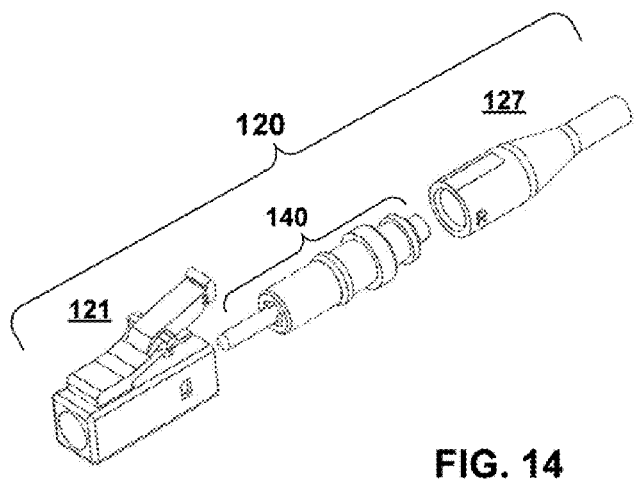
FIG. 14 shows an exploded view of the FIG. 12 connector, partially assembled.

FIG. 14 shows an exploded view of connector 120, in which the ferrule subassembly 123, tubing 124, and spring 125 have been loaded into frame 126, and in which press-fit retainer 122 has been seated in the mouth of frame 126 to form a unit 140 having a front end that fits into housing 121 and a rear end that fits into buffer boot 127.

Once the connector 120 has been assembled onto a multicore fiber, the fiber cores can be oriented relative to the latch arm on the housing by rotating frame 126 relative to the housing 121. Once the fiber cores are in the desired position relative to the connector housing 121, the frame 126 can be held in position with epoxy.

Figure 15:
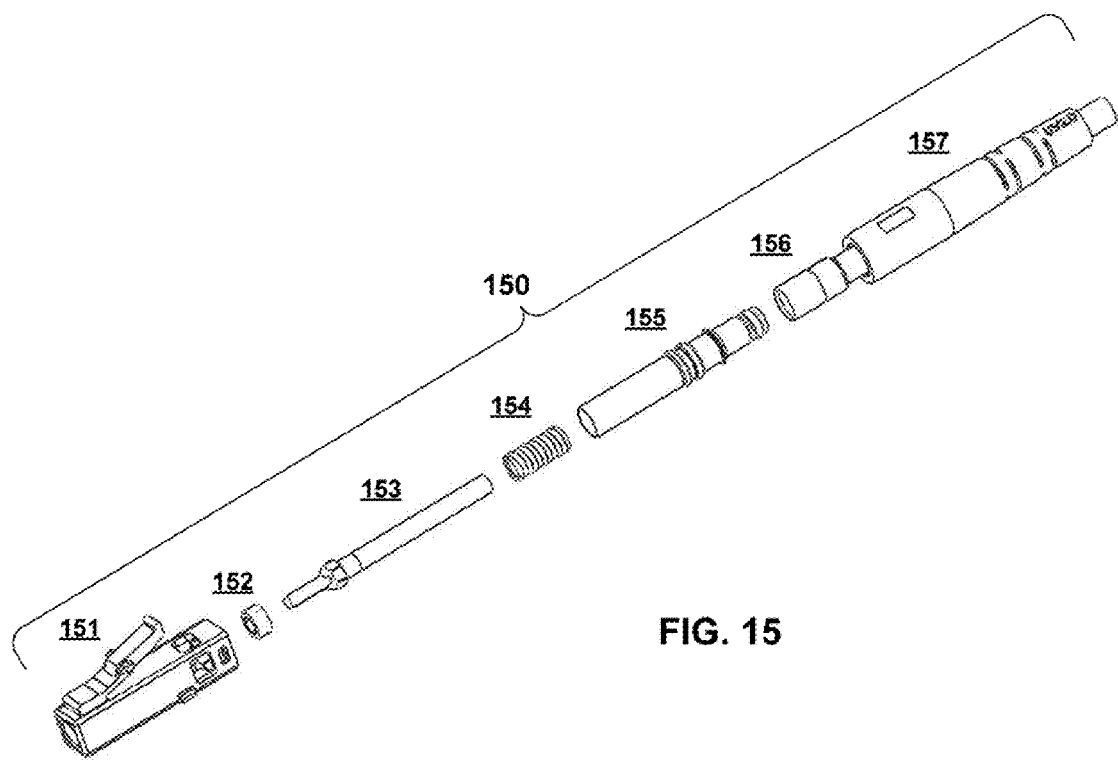
FIG. 15 shows an exploded view of an LC jumper version of the FIG. 12 connector.

FIG. 15 shows an exploded view of the LC Jumper version of the rotatable frame assembly concept. Connector 150 includes the following elements (left to right): plug housing 151; retainer 152; ferrule subassembly 153; spring 154; rotatable frame 155; crimp/sleeve subassembly 156 and buffer boot 157. Frame 126 has a substantially cylindrical shape, and has a cavity therein shaped to receive the ferrule subassembly 123.

Figure 16:
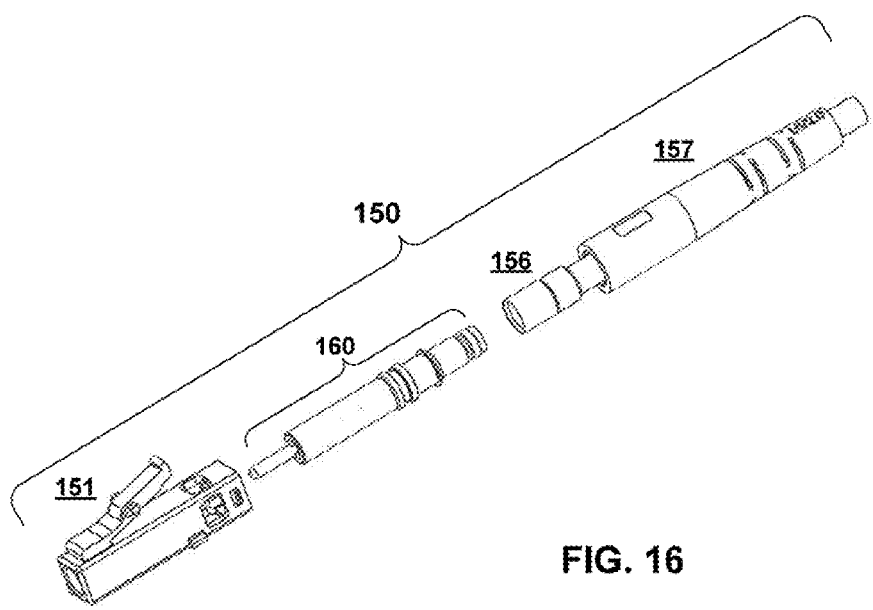
FIG. 16 shows an exploded view of the FIG. 15 connector, partially assembled.

FIG. 16 shows partially assembly connector 150, including the assembled rotatable frame assembly 160, comprising components 152-155, with the press-fit retainer 52 in place. The orientation method is the same as that employed for the BTW connector 120 (FIGS. 12-14) discussed above; however, LC jumper components are used.

13.2. Rotatable Frame with Bayonet-Style Retainer

Figure 17:
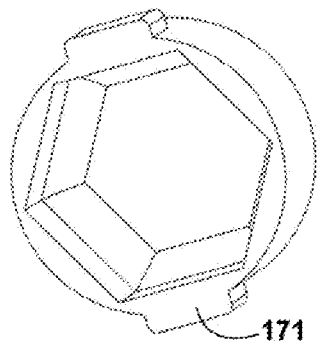
FIG. 17 shows a perspective view of a retainer element according to a further aspect of the invention, in which the retainer element is provided with a plurality of bayonet elements.

FIG. 17 shows a perspective view of a retainer 170 according to a further aspect of the invention, in which the retainer 170 is provided with a plurality of bayonet elements (e.g., retainer tabs) 171 that are configured to lock into mating bayonet elements (e.g., receiving slots) on a rotatable frame of the type described above.

Figure 18:
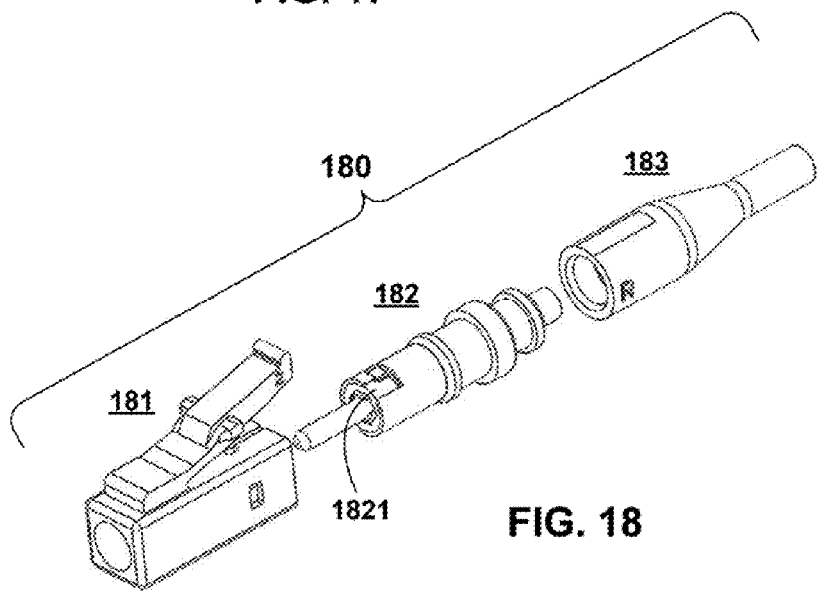
FIGS. 18 and 19 show, respectively, perspective views of a BTW LC connector and jumper connector, in which a retainer element of the type shown in FIG. 17 is used to hold a ferrule subassembly within a rotatable frame.
Figure 19:
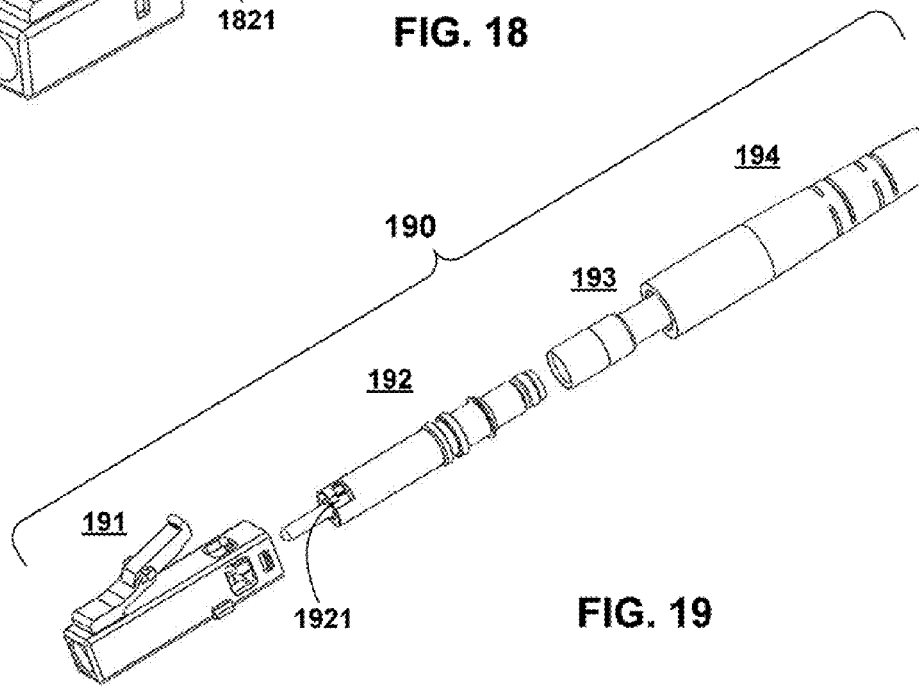

FIGS. 18 and 19 show, respectively, perspective views of a BTW connector 180 and jumper connector 190. Connectors 180, 190 include a unit 182, 192 comprising a rotatable frame into which a ferrule subassembly has been loaded, and into which a bayonet-style retain of the type shown in FIG. 17 has been inserted and rotated, with retainer tabs captured by corresponding bayonet slots 1821, 1921.

The retainer captures the ferrule subassembly within the rotatable frame, thus performing the function of the press-fit retainer described above.

The front end of the assembled unit 182, 192 is inserted into the plug housing 181, 191, and the rear end of the assembled unit 182, 192 is inserted into boot 183 in connector 180 and into crimp/sleeve subassembly 193 and boot 194 in connector 190.

13.3. Rotatable Frame Assembly with Rear-End Press-Fit Retainer

In an alternate embodiment, the ferrule subassembly and spring are captured within the rotatable frame assembly by a press-fit retainer installed at the rear end.

Figure 20:
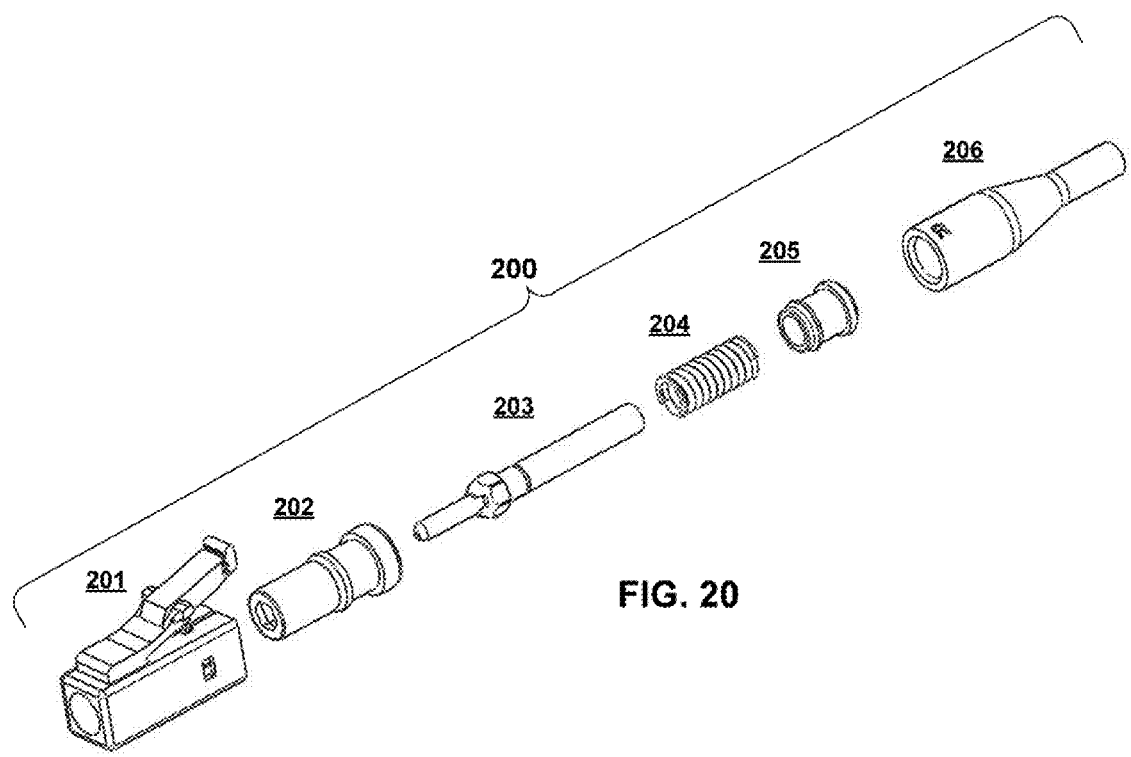
FIG. 20 shows an exploded view of a BTW LC connector according to a further aspect of the invention, in which a rear-end retainer element is used to hold a ferrule subassembly within a rotatable frame.

FIG. 20 shows an exploded view of a BTW connector 200 according to this aspect of the invention. Connector 200 comprises the following components: plug housing 201; rotatable frame 202; ferrule subassembly 203; spring 204; press-fit retainer 205; and buffer boot 206.

Figure 21:
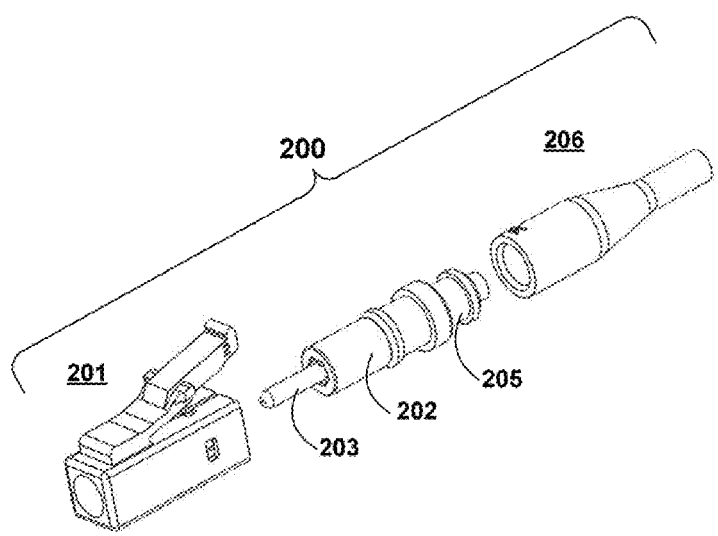
FIG. 21 shows the FIG. 20 connector, partially assembled, with the rear-end retainer pressed into position.

FIG. 21 shows an exploded view of connector 200, in which rotatable frame 202, ferrule subassembly 203, spring 204, and press-fit retainer 205 have been assembled together into a single unit.

Figure 22:
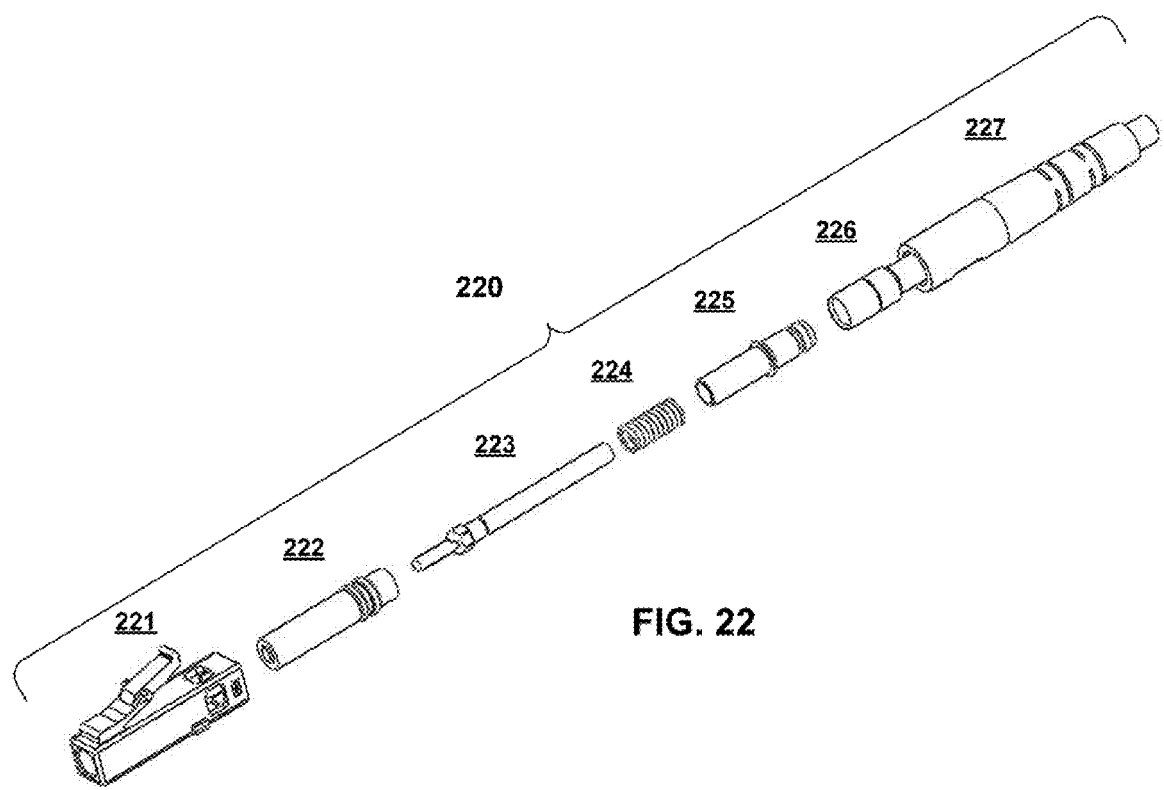
FIG. 22 shows an exploded view of a jumper LC connector, according to a further aspect of the invention, in which a rear-end retainer element is used to hold a ferrule subassembly within a rotatable frame.

FIG. 22 shows an exploded view of a jumper LC connector 220 according to this aspect of the invention. Connector 220 comprises the following components: plug housing 221; rotatable frame 222; ferrule subassembly 223; spring 224; press-fit retainer 225; crimp/sleeve subassembly 226; and strain-relief boot 227.

Figure 23:
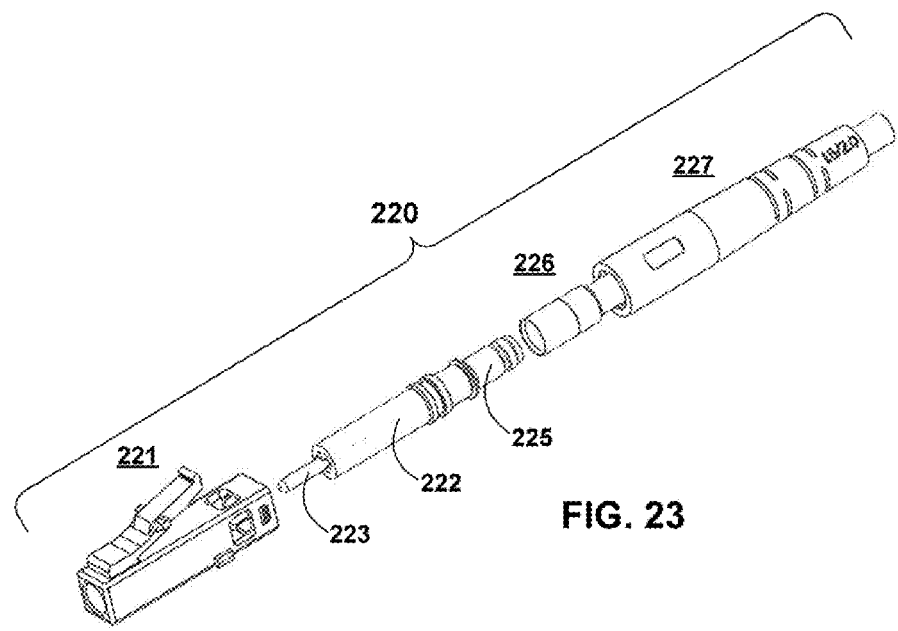
FIG. 23 shows an exploded view of the FIG. 22 connector, partially assembled.

FIG. 23 shows an exploded view of connector 220, in which rotatable frame 222, ferrule subassembly 223, spring 224, and press-fit retainer 225 have been assembled together into a single unit.

1.4. LC Connector with Extended Flange

According to a further aspect of the invention, an extended ferrule/flange and a rotatable extender are used to provide continuous rotational alignment of the ferrule subassembly within a multicore fiber cable connector. As described below, the use of an extended ferrule flange and rotatable extender allows the rotational alignment of the ferrule subassembly to be controller from the boot end of the connector.

Figure 24:
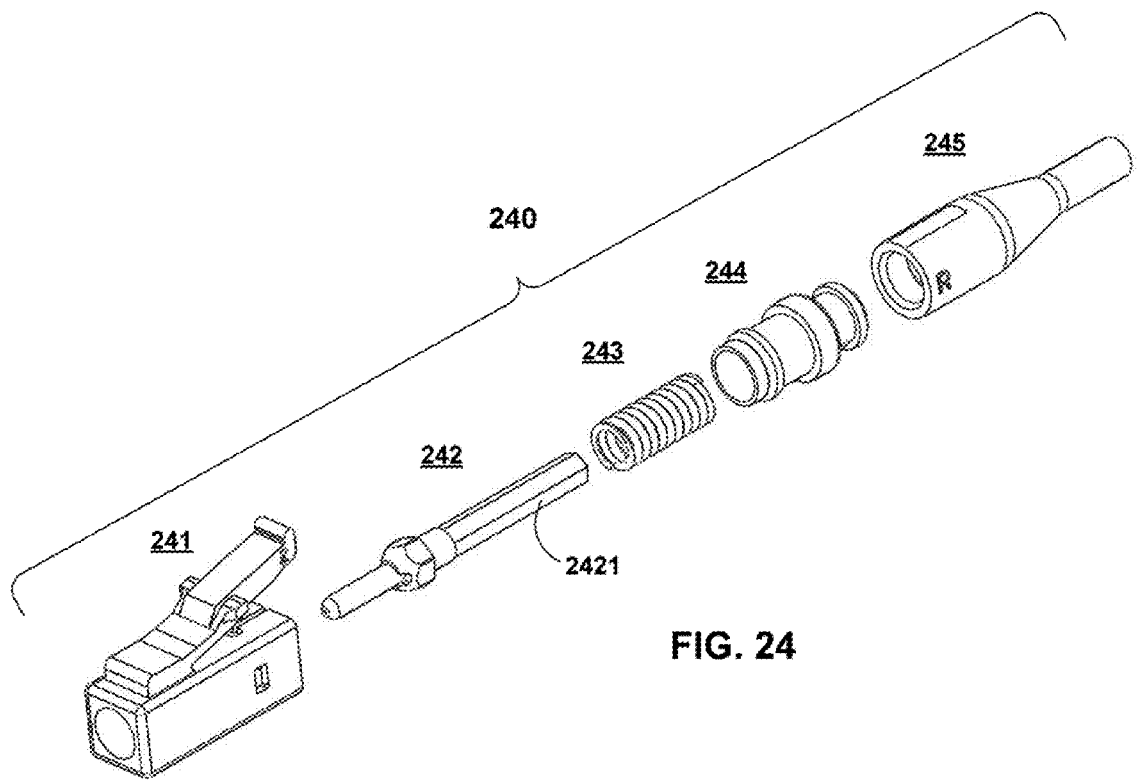
FIG. 24 shows an exploded view of a BTW LC connector, according to a further aspect of the invention, wherein a flange extending member and an extender are used to provide rotational alignment of a multicore fiber mounted into the connector.

FIG. 24 shows an exploded view of a BTW LC connector 240 according to a further aspect of the invention. From left to the right, the connector 240 comprises the following elements: plug housing 241, extended ferrule subassembly 242, spring 243, rotatable extender 244, and boot 245.

Ferrule subassembly 242 includes at its rear end a flange extension member 2421, which has an opening 2422 (FIG. 25) therethrough that is dimensioned to receive the lead end of a buffered fiber.

In the depicted example, the flange extension member 2421 has a hexagonal outer perimeter, but other polygonal shapes could also be used. e.g., square, rectangle, or the like. The flange extension member 2421 could also have a D-shaped or double D-shaped perimeter. Further, the flange extension member 2421 could be fabricated as a single unit with other components of subassembly 242.

The internal geometry 2441 of rotatable extender 244 comprises a closely toleranced hole, having the same shape as the outer perimeter of the flange extension member 2421, allowing a slip fit between the two components.

Figure 25:
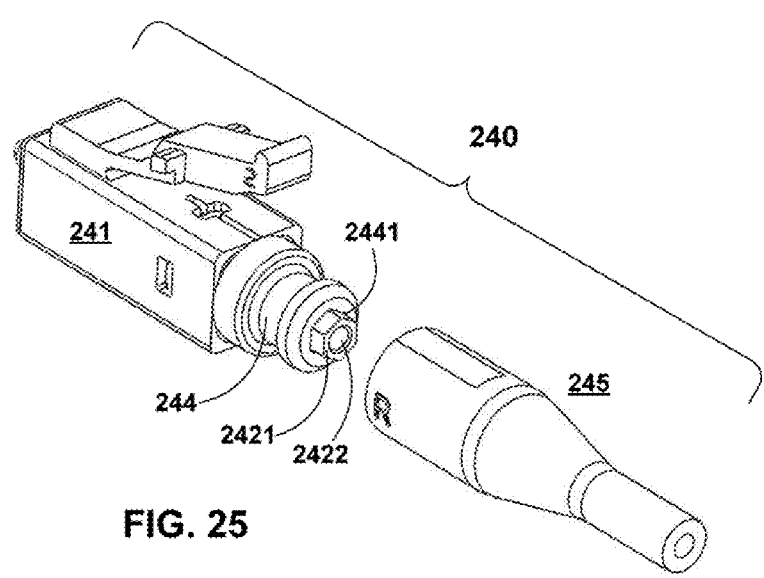
FIG. 25 shows a perspective rear view of the connector shown in FIG. 24, after partial assembly.

FIG. 25 shows a perspective rear view of the partially assembled connector 240, illustrating how the flange extension 2421 fits into the rotatable extender 244. It will be seen that the rotatable extender 244, the flange extension member 2421, and the ferrule subassembly 242 rotate as a unit relative to the plug housing 241.

Once the fiber is terminated and polished, the rotatable extender 244 can be rotated relative to the plug housing 241, which causes the flange extension member 2421 to rotate around the ferrule axis, allowing the cores of the multicore fiber to be aligned in the desired rotational orientation. Once the fiber cores are in the desired position relative to the latch arm on the connector housing 241, the extender 244 can be held in position with epoxy.

Figure 26:
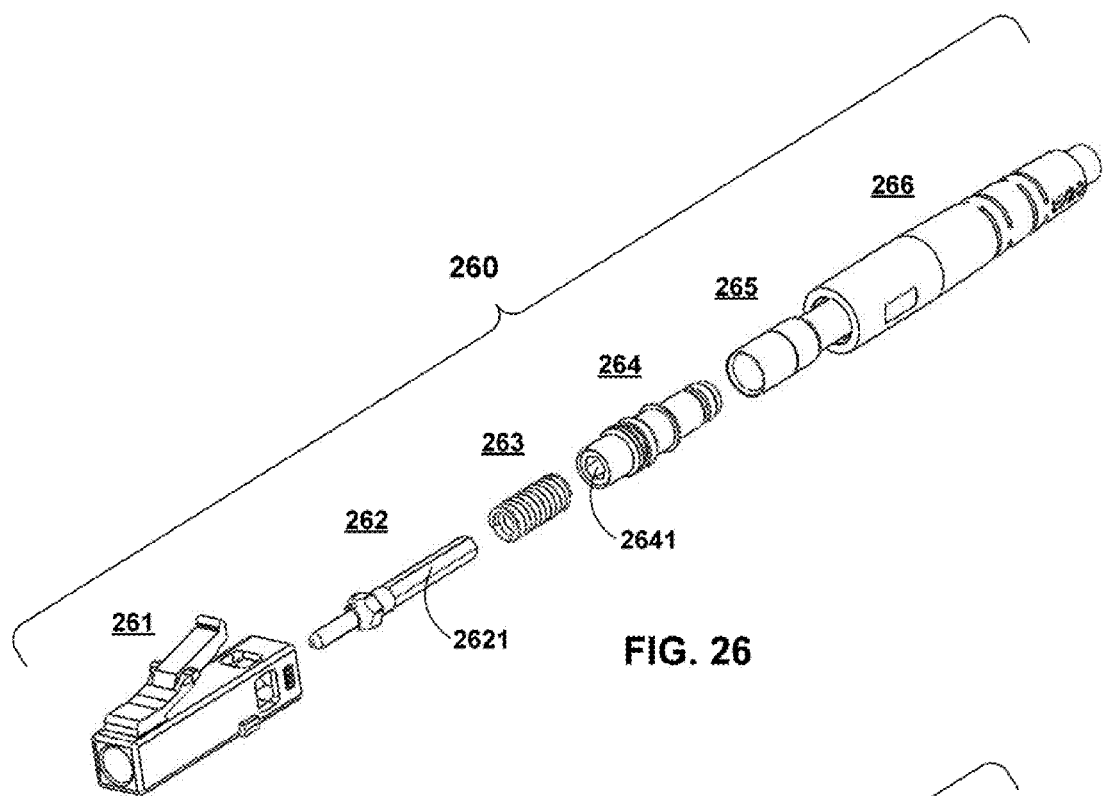
FIG. 26 shows an exploded view of a jumper LC connector, according to a further aspect of the invention, wherein a flange extending member and an extender are used to provide rotational alignment of a multicore fiber mounted into the connector.

FIG. 26 shows an exploded view of a jumper LC connector 260 incorporating the above-described flange extension and rotatable extender. Connector 260 comprises: plug housing 261; ferrule subassembly 262 with extension member 2621; spring 263; cable-retention rotatable extender 264 with opening 2641; crimp/sleeve subassembly 265; and strain-relief boot 266.

Figure 27:
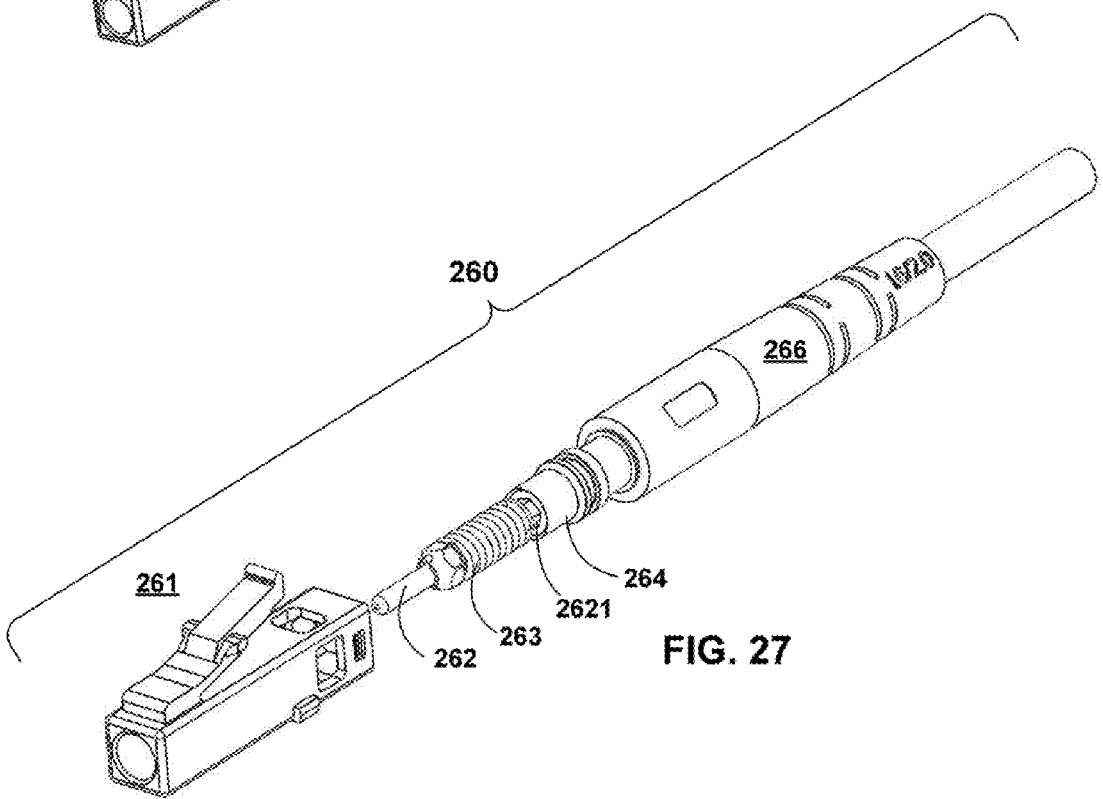
FIG. 27 shows an exploded view of the connector shown in FIG. 26, after partial assembly.

FIG. 27 shows an exploded view of jumper LC connector 260, after partial assembly, in which the extension member 2621 engages the hexagonal internal opening 2641 of the rotatable extender 264.

When the cable-retention rotatable extender 264 is rotated relative to the plug housing 261, the ferrule subassembly 262 and extension member 2621 will also rotate. Therefore, the orientation technique basically the same as that employed for the BTW connector 240 (FIG. 24) discussed above.

Figure 28:
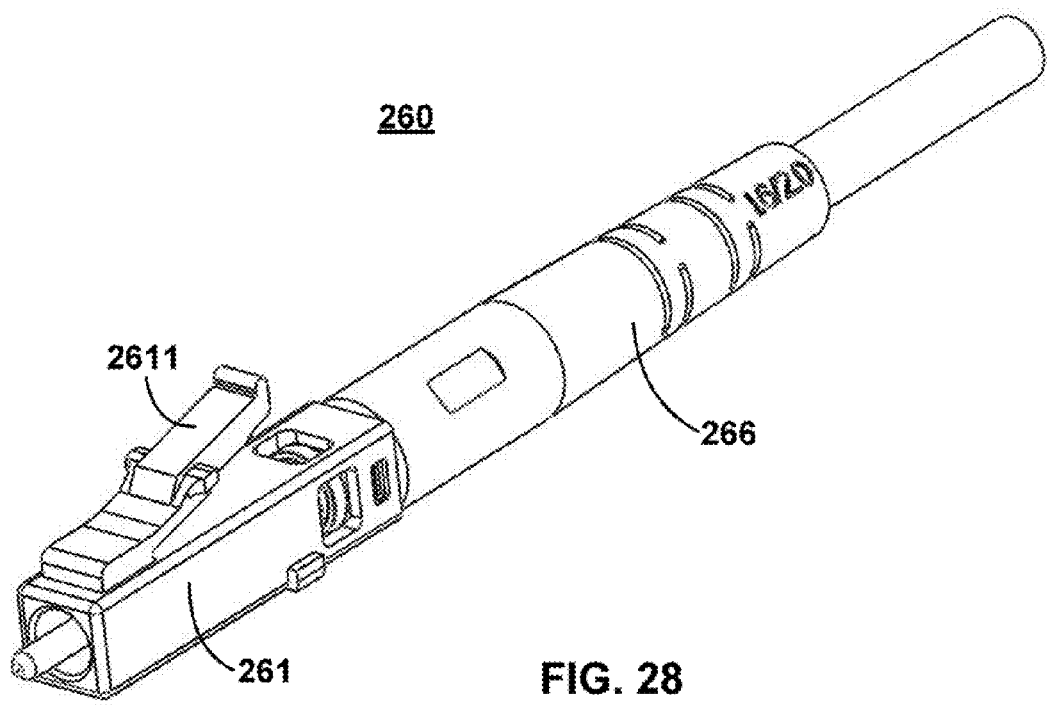
FIG. 28 shows a perspective view of the connector shown in FIG. 26, after full assembly.

FIG. 28 shows a perspective view of connector 260, after full assembly. With the crimp/sleeve subassembly 265 and strain-relief boot 266 permanently installed, the fiber cores can be oriented relative to the latch arm 2611 on the plug housing 261 by rotating the boot 266 relative to the housing 261. Once the cores are in the desired orientation, the rotatable extender 264 can be fixed relative to the housing 261 using epoxy.

2. Multicore Simplex Connectors

SC-Type

The above-described structures and techniques are also applicable to SC-type connectors. A brief description of prior-art SC connectors is provided for context, followed by a discussion of a number of designs according to various aspects of the invention.

2.1. Prior-Art SC Connectors

Figure 29:
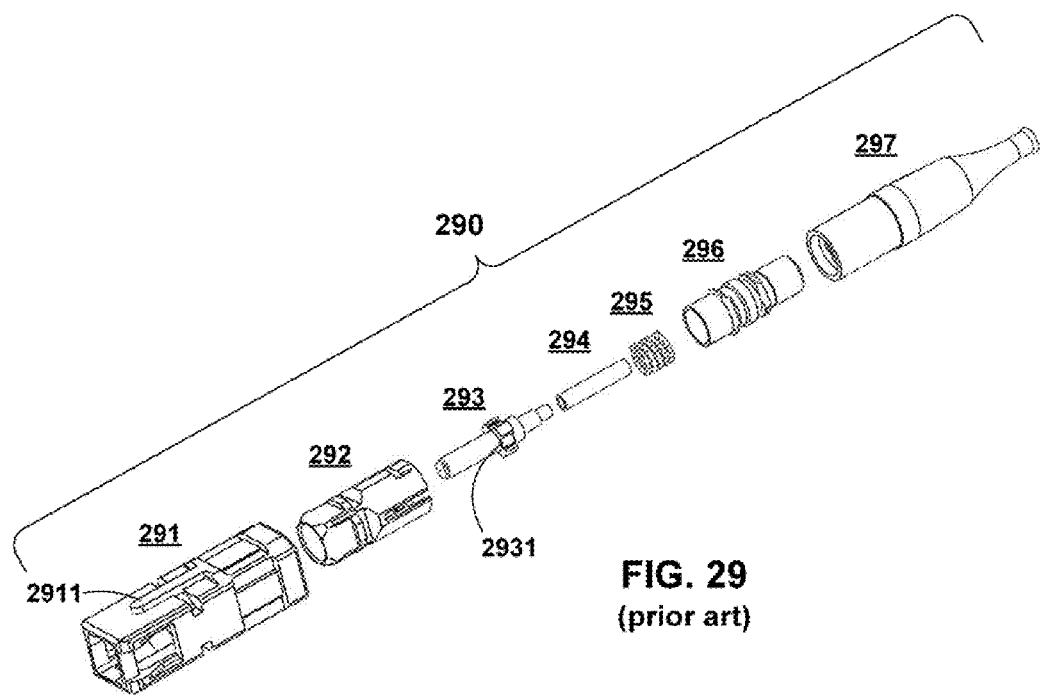
FIG. 29 shows an exploded view of a standard BTW SC connector according to the prior art.

FIG. 29 shows an exploded view of a standard BTW SC connector 290 according to the prior art. Connector 290 comprises the following elements, listed from left to right: grip 291; plug housing 292; ferrule subassembly 293; tubing 294; spring 295; cable retention member 296; and buffer boot 297.

Ferrule subassembly 293, comprises a ferrule and a receptacle having a flange with at least one keyway 2931. Ferrule subassembly 293 sits within plug housing 292 which has matching internal keys 3121 (FIG. 34), to inhibit rotation of the ferrule subassembly 293 relative to the plug housing 292. Some SC ferrule flange designs utilize up to four keyways, allowing the ferrule subassembly 293 to be installed in one of four positions (i.e. 90-degree positional tuning), relative to the plug housing 292, to improve core-to-core alignment.

Figure 30:
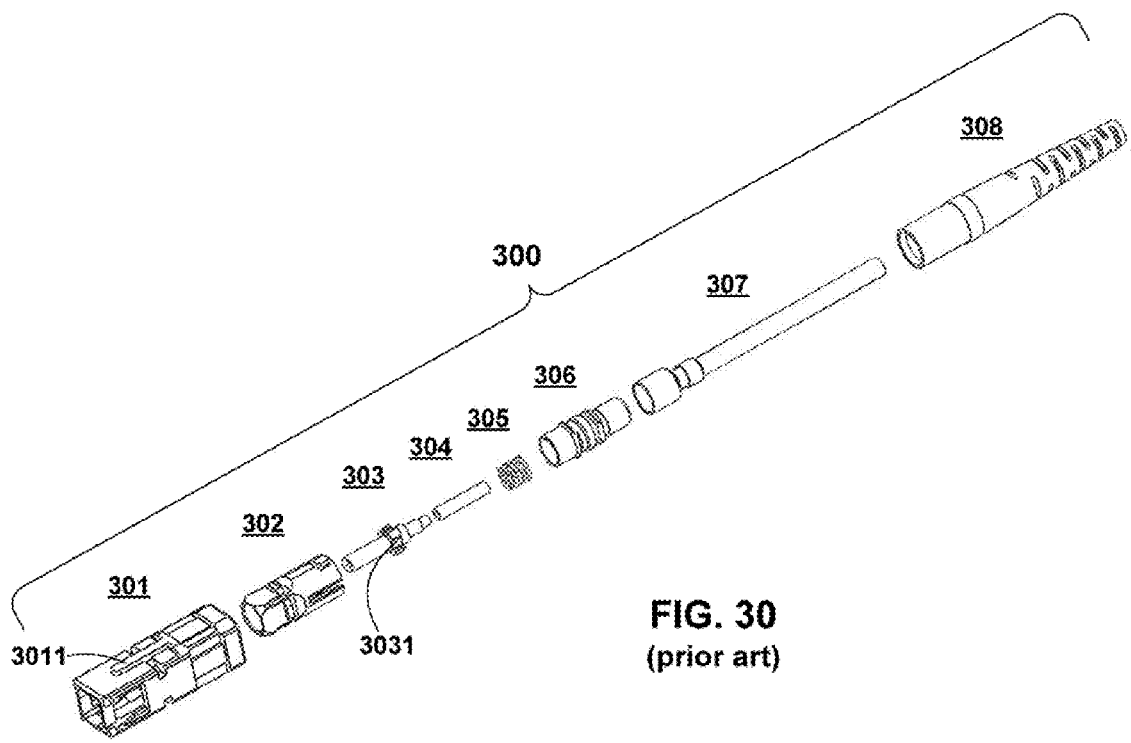
FIG. 30 shows an exploded view of a standard jumper SC connector according to the prior art.

FIG. 30 shows an exploded view of a standard jumper SC connector 300 according to the prior art. Connector 300 comprises the following elements, listed from left to right: grip 301 (including key(s) 3011); plug housing 302; ferrule subassembly 303; tubing 304; spring 305; cable retention member 306; crimp/sleeve subassembly 307; and strain-relief boot 308.

2.2. SC Connectors with Rotatable Flange Collar

2.2.1. Collar with Keyways or Keys

FIG. 31 shows an exploded view of a BTW SC connector 3100 according to a further aspect of the invention. Connector 3100 comprises the following elements, from left to right: grip 3101 with key(s) 3120; plug housing 3102; rotatable collar 3103; ferrule subassembly 3104; tubing 3105; spring 3106; cable retention member 3107; buffer boot 3108.

In the embodiment shown, the rotatable collar 3103 features two keyway cutouts 3121. Alternative versions, with only one keyway or several keyways, are also feasible.

FIG. 32 shows a close-up of collar 3103, ferrule subassembly 3104, and tubing 3105, installed onto a buffered fiber 3200. Once the fiber 3200 is terminated and polished, the ferrule subassembly 3104 can be rotated relative to the collar 3103, to allow the cores of the multicore fiber 3200 to be aligned in the desired orientation.

Figure 33:
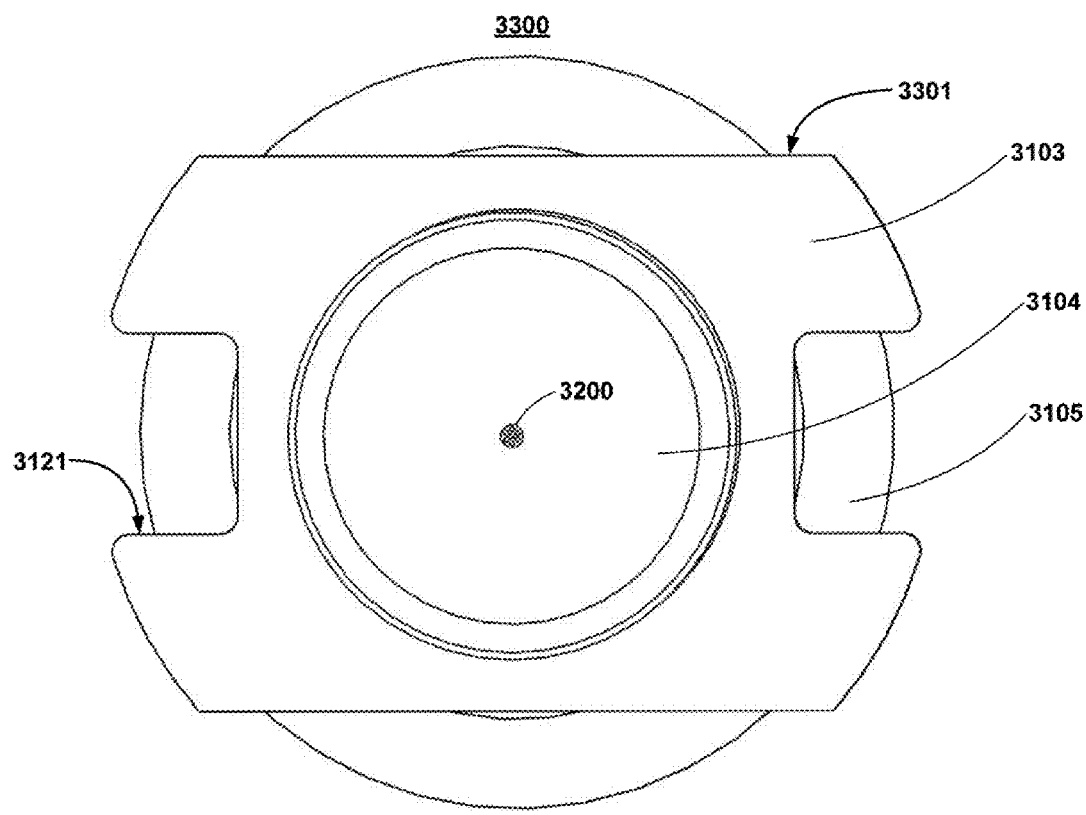
FIG. 33 shows an end view of the ferrule subassembly shown in FIG. 32.

FIG. 33 shows an end view of a unit 3300 comprising the assembled collar 3103, ferrule subassembly 3104, tubing 3105, and fiber 3200. Collar 3103 is positioned so that a particular core of multicore fiber 3200 is directly adjacent to one of the collar flats 3301. In one likely scenario, the rotatable collar 3103 is held fixed in a fixture while the ferrule flange barrel is rotated within the collar 3103. Once the collar 3103 is in the desired position relative to the ferrule flange barrel, it can be held in position with epoxy. Alternatively, the collar 3103 could be designed to provide a light press fit onto the ferrule, which would inhibit rotation after orientation.

Figure 34:
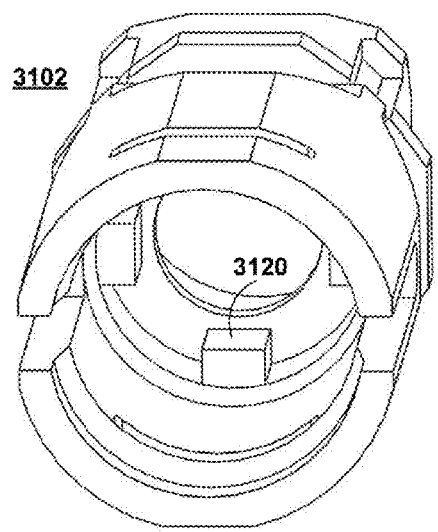
FIG. 34 shows a rear view of the plug frame from the FIG. 31 connector.

FIG. 34 shows a rear view of the plug housing 312. Once the flange collar 3103 is oriented, the flange assembly can be installed into the plug housing 3102, which features keys 3120, which mate with the keyways of the rotatable flange collar. The internal keys hold the flange assembly in the desired orientation, relative to the plug housing. After the connector is completely installed onto the fiber cable, the SC grip, which has a key 3111 on top, is installed to complete keying of the connector.

Figure 35:
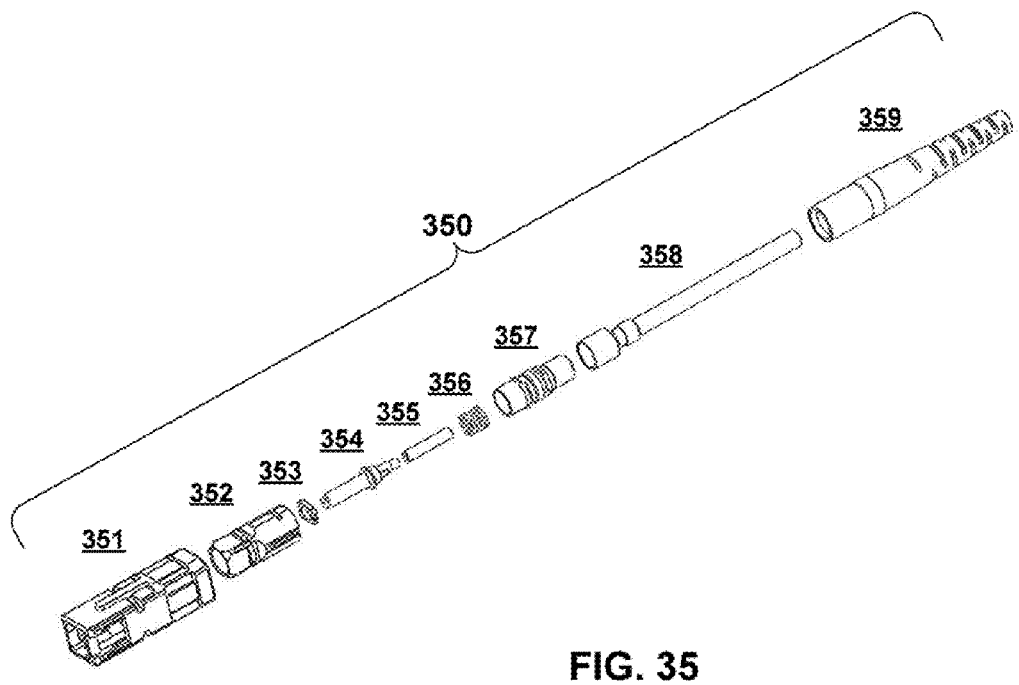
FIG. 35 shows an exploded view of a jumper SC connector, according to a further aspect of the invention, incorporating a rotatable collar of the type used in the FIG. 31 connector.

FIG. 35 shows an exploded view of a jumper SC connector 350 incorporating the above-described rotatable collar. Connector 350 comprises the following elements, from left to right: grip 351 with key(s); plug housing 352; rotatable collar 353; ferrule subassembly 354; tubing 355; spring 356; cable retention member 357; crimp/sleeve subassembly 358, and buffer boot 359.

The orientation technique is the same as that employed for the BTW connector, however, SC jumper components are used.

2.2.2. Other Collar Geometries

Alternative collar geometries are also feasible. The flange collar with keyways is just one of many possible configurations. In alternate embodiments, the flange collar could feature keys and matching keyways could be placed in the plug housing. Also, it is feasible to use flange collars having other polygonal shapes, e.g., square, rectangular, triangular, and the like. The collar could also be D-shaped or double-D shaped. Here again, the internal geometry of the plug housing would be changed to match the collar geometry.

Figure 36A:
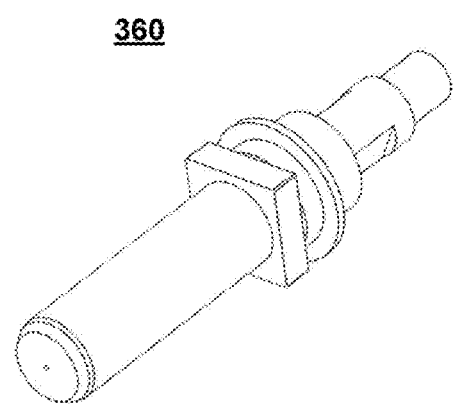
FIGS. 36A-36B show perspective views of other possible geometries for a rotatable collar suitable for use in conjunction with connectors of the type shown in FIGS. 31 and 35.
Figure 36B:
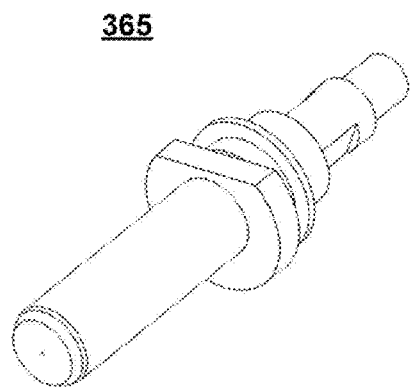

FIGS. 36A and 36B show perspective views of other possible collar geometries 360, 365.

2.3. SC Connector with Rotatable Cable Retention Member

2.3.1. Rotatable Retention Member with Keys

Figure 37:
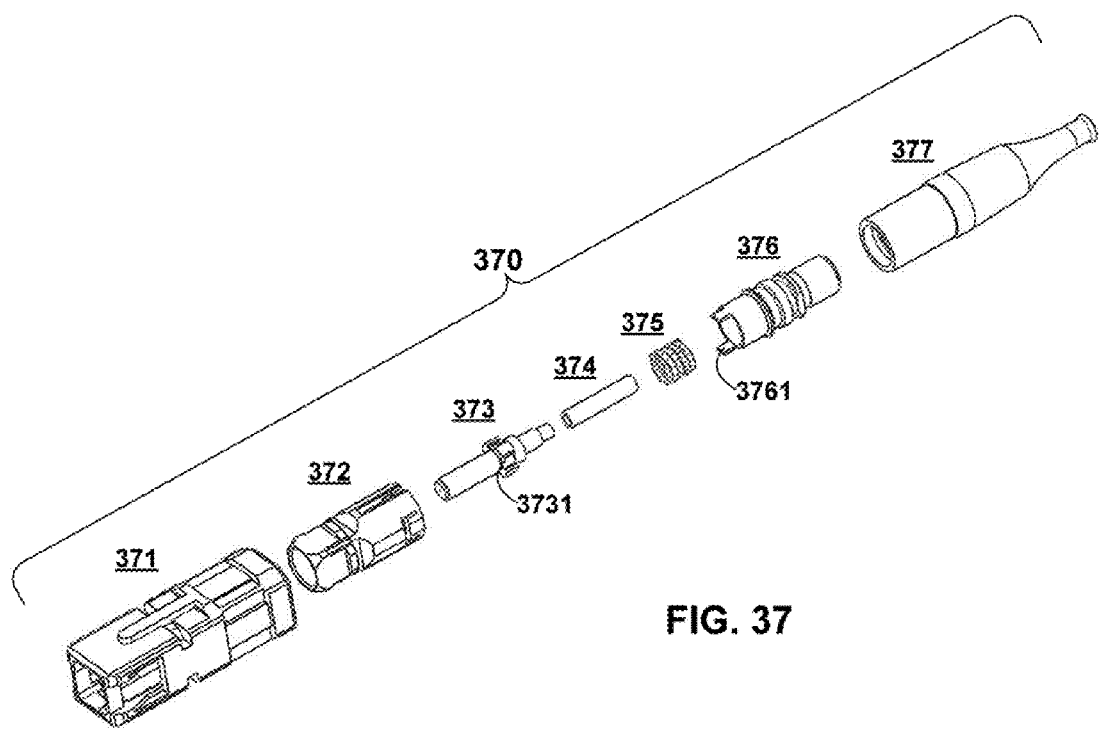
FIG. 37 contains an exploded view of a BTW SC connector according to a further aspect of the invention, incorporating a rotatable cable retention member that snaps into the back of the plug frame.

FIG. 37 contains an exploded view of a BTW SC connector 370 that features a rotatable cable retention member that snaps into the back of the plug housing. Connector 370 comprises the following elements, from left to right: grip 371 with key(s); plug housing 372; ferrule subassembly 373; tubing 374; spring 375; retention member 376; and buffer boot 377.

The ferrule subassembly 373, tubing, and spring 375 are captured within the plug housing 372 by the retention member 376.

Figure 38:
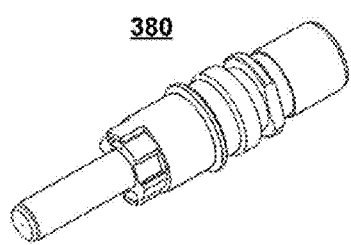
FIG. 38 shows a perspective view of the assembled ferrule subassembly and rotatable retention member from the connector shown in FIG. 37.

FIG. 38 shows a perspective view of a unit 380 comprising the following assembled components: ferrule subassembly 373, tubing 374, spring 375, and rotatable retention member 376. The retention member 376 has two keys 3761 extending from its forward end, which engage keyways 3731 on the ferrule flange 373. However, other embodiments, in which the retention member features only one key or several keys, are also feasible.

Figure 39:
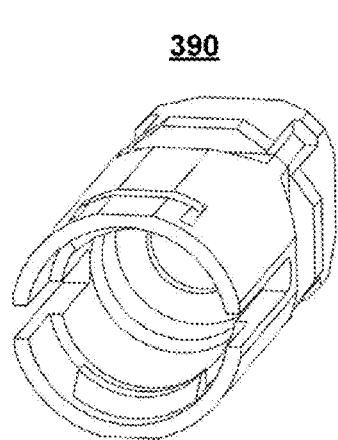
FIG. 39 shows a rear perspective view of a plug frame, according to a further aspect of the invention.

The plug housing 390 shown in FIG. 39, does not feature internal keys. Therefore, when the retention member is rotated relative to the plug housing, the ferrule subassembly 373 is free to rotate as well.

Figure 40:
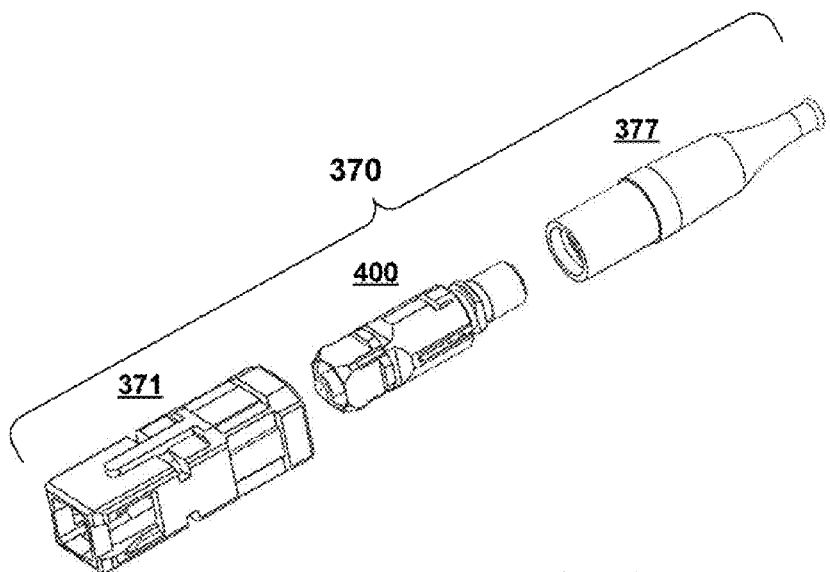
FIG. 40 shows an exploded view of the connector shown in FIG. 37, after assembly of the plug frame and the rotatable cable retention member.

FIG. 40 shows the partially assembled connector 370, including unit 400 formed by snapping unit 380 (FIG. 38) into place within plug housing 372. Once the fully assembled connector is installed onto a multicore fiber, the fiber cores can be oriented relative to the plug housing, by simply rotating the retention member relative to the plug housing 372. Once the fiber cores are in the desired position relative to the connector housing, the rotatable retention member can be held in position with epoxy, placed in the slots at the rear of the plug housing.

Figure 41:
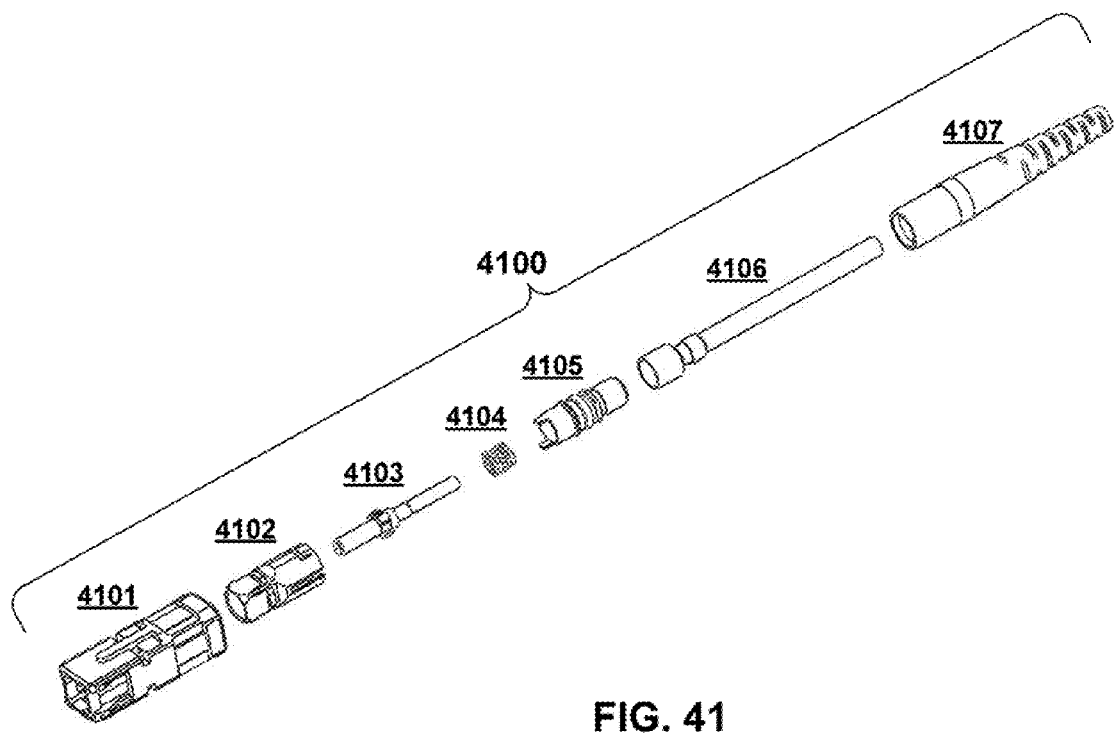
FIG. 41 shows an exploded view of a connector according to a further aspect of the invention, comprising a jumper version of the connector shown in FIG. 37.

FIG. 41 shows an exploded view of a connector 4100 comprising a jumper version of the rotatable retention member concept. Connector 4100 comprises the following components, left to right: grip 4101; plug housing 4102; ferrule subassembly 4103; spring 4104; rotatable cable retention member 4105; crimp/sleeve subassembly 4106; and strain-relief boot 4107.

Figure 42:
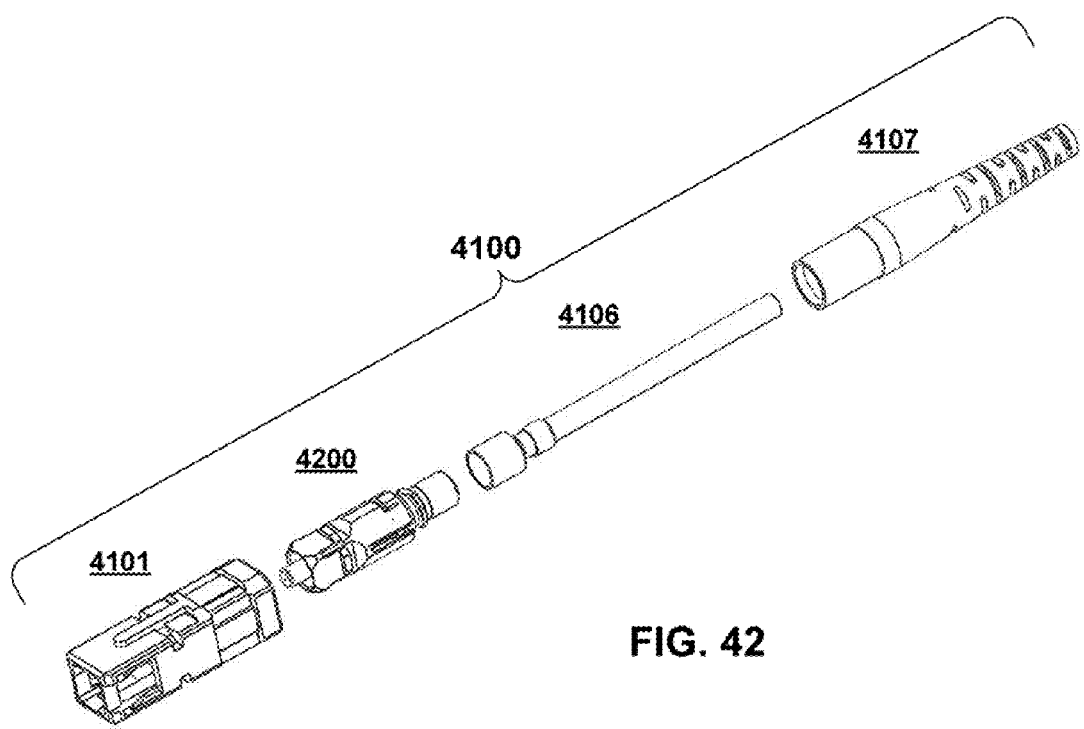
FIG. 42 shows an exploded view of the FIG. 41 connector, after assembly of the plug frame, ferrule subassembly, and rotatable retention member.

FIG. 42 shows the partially assembled connector 4100, including unit 4200 comprising ferrule subassembly 4103, spring 4104, and rotatable cable retention member 4105 snapped into place within housing 4102. The orientation method is the same as that employed for the BTW connector; however, SC jumper components are used.

3. General Techniques

Figure 43:
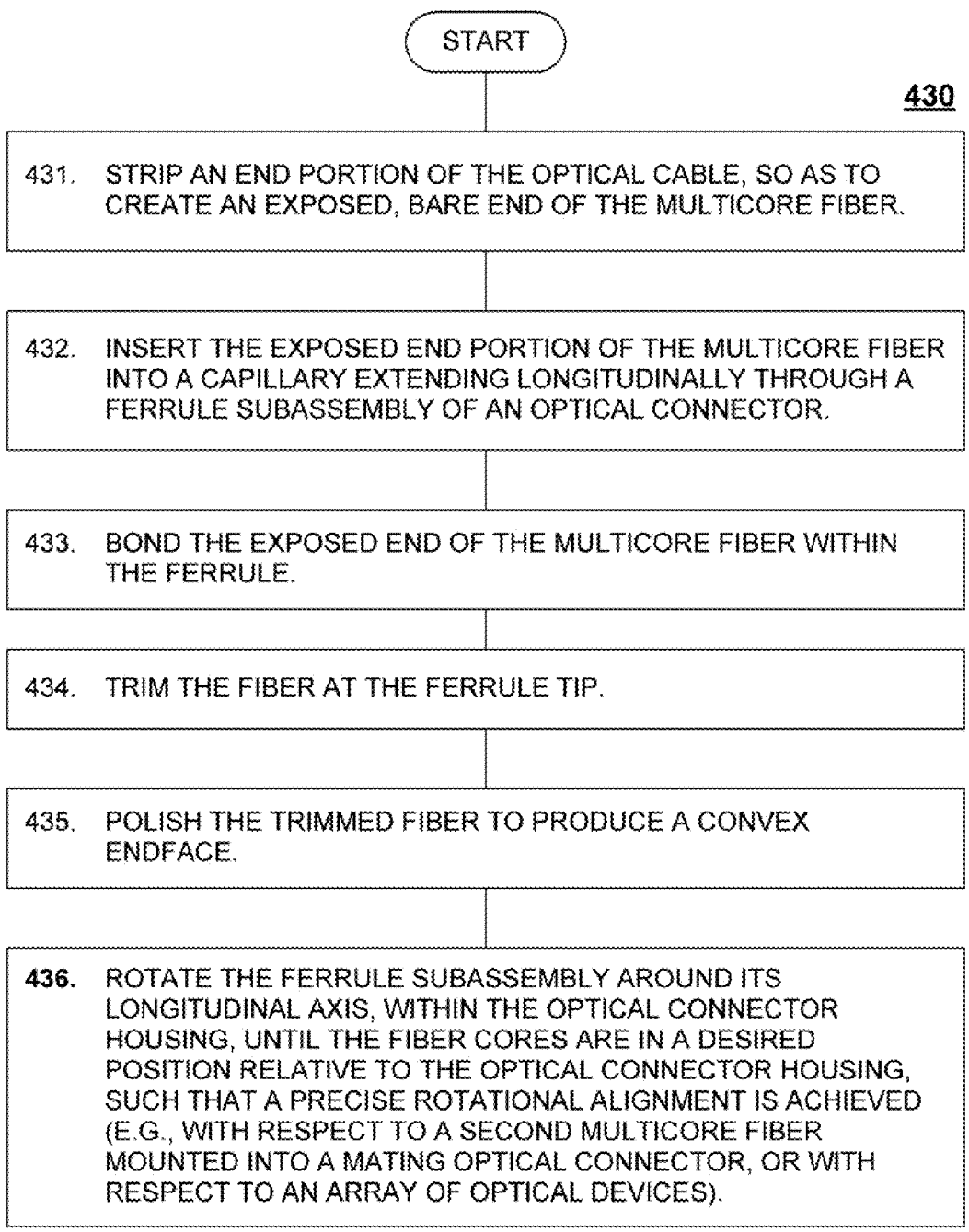
FIGS. 43 and 44 show flowcharts of general techniques according to aspects of the invention.
Figure 44:
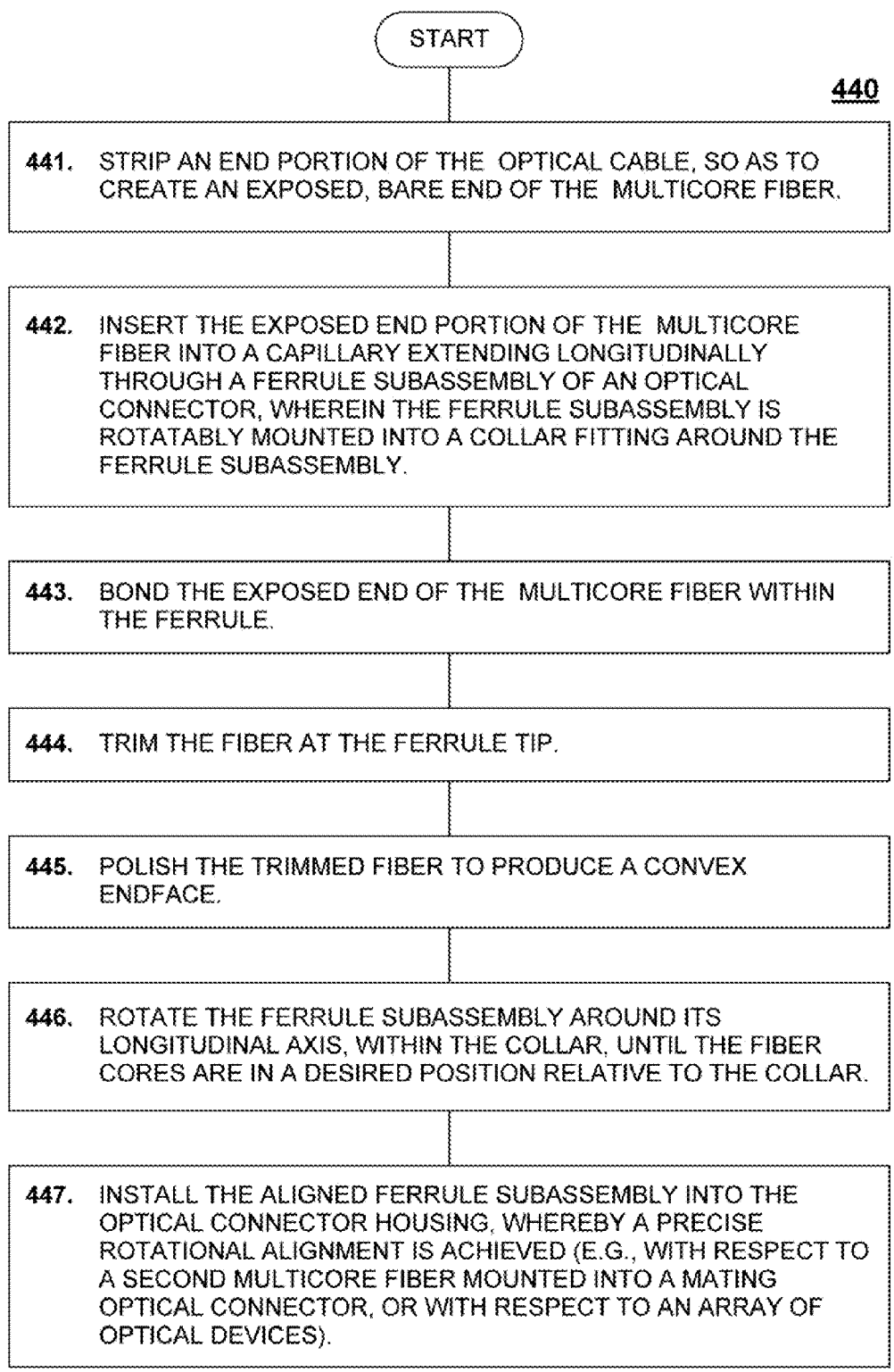

FIGS. 43 and 44 show flowcharts of general techniques 430, 440, according to aspects of the invention. It should be noted that FIGS. 43 and 44 are intended to be exemplary, rather than limiting. The present invention may be practiced in a number of different ways, using different combinations of some or all of the elements set forth in these drawings, as well as combinations including elements not explicitly set forth in these drawings.

FIG. 43 shows a flowchart of a technique 430 for providing aligned connectorization for an optical cable containing a multicore fiber.

Technique 430 comprises the following steps:
- 431: Strip an end portion of the optical cable, so as to create an exposed, bare end of the multicore fiber.
- 432: Insert the exposed end portion of the multicore fiber into a capillary extending longitudinally through a ferrule subassembly of an optical connector.
- 433: Bond the exposed end of the multicore fiber within the ferrule.
- 434: Trim the fiber at the ferrule tip.
- 435: Polish the trimmed fiber to produce a convex endface.
- 436: Rotate the ferrule subassembly around its longitudinal axis, within the optical connector housing, until the fiber cores are in a desired position relative to the optical connector housing, such that a precise rotational alignment is achieved.

In step 436, the precise rotational alignment may be achieved, for example, with respect to a second multicore fiber mounted into a mating optical connector, or with respect to an array of optical devices.

FIG. 44 shows a flowchart of a technique 440 providing aligned connectorization for an optical cable containing a multicore fiber.

Technique 440 comprises the following steps:
- 441: Strip an end portion of the optical cable, so as to create an exposed, bare end of the multicore fiber.
- 442: Insert the exposed end portion of the multicore fiber into a capillary extending longitudinally through a ferrule subassembly of an optical connector, wherein the ferrule subassembly is rotatably mounted into a collar fitting around the ferrule subassembly.
- 443: Bond the exposed end of the multicore fiber within the ferrule.
- 444; Trim the fiber at the ferrule tip.
- 445: Polish the trimmed fiber to produce a convex endface.
- 446: Rotate the ferrule subassembly around its longitudinal axis, within the collar, until the fiber cores are in a desired position relative to the collar.
- 447: Install the aligned ferrule subassembly into the optical connector housing, whereby a precise rotational alignment is achieved.

In step 447, the precise rotational alignment may be achieved, for example, with respect to a second multicore fiber mounted into a mating optical connector, or with respect to an array of optical devices.

4. Conclusion

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

The invention claimed is:

1. An optical fiber cable connector, comprising:
a ferrule subassembly, including
   a ferrule,
   a receptacle having a lead end to which the ferrule is mounted, and
   a flange extension member mounted to the tail end of the receptacle;
an extender having an internal opening closely fitting around the flange extension member; and
an enclosure in which the ferrule subassembly is loaded,
wherein the ferrule subassembly, extender, and enclosure have a common longitudinal axis,
wherein the ferrule subassembly and extender are continuously rotatable within the enclosure,
wherein the rotation of the ferrule subassembly and extender within the enclosure is controlled by rotation of an exposed rear end of the extender, and
wherein the flange extension member and the extender internal opening have a polygonal perimeter.

2. The connector of claim 1,
wherein the flange extension member and the extender internal opening have a hexagonal perimeter.

3. The connector of claim 1,
wherein the flange extension member and the extender internal opening have a rectangular perimeter.

4. The connector of claim 3,
wherein the flange extension member and the extender internal opening have a square perimeter.

5. An optical fiber cable connector, comprising:
a ferrule subassembly, including
   a ferrule,
   a receptacle having a lead end to which the ferrule is mounted, and
   a flange extension member mounted to the tail end of the receptacle;
an extender having an internal opening closely fitting around the flange extension member; and
an enclosure in which the ferrule subassembly is loaded,
wherein the ferrule subassembly, extender, and enclosure have a common longitudinal axis,
wherein the ferrule subassembly and extender are continuously rotatable within the enclosure,
wherein the rotation of the ferrule subassembly and extender within the enclosure is controlled by rotation of an exposed rear end of the extender, and
wherein the flange extension member and the extender internal opening have a D-shaped perimeter.

6. An optical fiber cable connector, comprising:
a ferrule subassembly, including
   a ferrule,
   a receptacle having a lead end to which the ferrule is mounted, and
   a flange extension member mounted to the tall end of the receptacle;
an extender having an internal opening closely fitting around the flange extension member; and
an enclosure in which the ferrule subassembly is loaded,
wherein the ferrule subassembly, extender, and enclosure have a common longitudinal axis,
wherein the ferrule subassembly and extender are continuously rotatable within the enclosure,
wherein the rotation of the ferrule subassembly and extender within the enclosure is controlled by rotation of an exposed rear end of the extender, and
wherein the flange extension member and the extender internal opening have a double D-shaped perimeter.

7. A method for providing an aligned connectorization for an optical cable containing a multicore fiber cable, comprising:
   (a) stripping an end portion of the optical cable, so as to create an exposed, bare end of the multicore fiber;
   (b) inserting the exposed end portion of the multicore fiber into a capillary extending longitudinally through a ferrule subassembly of an optical connector,
   wherein the ferrule subassembly comprises a ferrule mounted into a receptacle;
   (c) bonding the exposed end of the multicore fiber within the ferrule;
   (d) trimming the fiber at the ferrule tip;
   (e) polishing the trimmed fiber to produce a convex endface; and
   (f) rotating the ferrule subassembly around its longitudinal axis, within an optical connector housing into which the ferrule subassembly is loaded, until the fiber cores are in a desired position relative to the optical connector housing, such that a precise rotational alignment is achieved.

8. The method of claim 7,
wherein in step (f), a precise rotational alignment is achieved with respect to a second multicore fiber mounted into a mating optical connector.

9. The method of claim 7,
wherein in step (f), a precise rotational alignment is achieved with respect to an array of optical devices.

10. The method of claim 7,
wherein in step (b) the ferrule subassembly is loaded into a rotatable frame within the optical connector housing.

11. The method of claim 10,
wherein in step (f) the ferrule subassembly is rotated by rotating the rotatable frame.

12. The method of claim 7,
wherein in step (b) the ferrule subassembly extends through an extender, via a slip fit, within the optical connector housing.

13. The method of claim 12,
wherein in step (f) the ferrule subassembly is caused to rotate longitudinally by rotating the extender.

14. The method of claim 7,
wherein step (f) further includes verifying the positions of the fiber cores relative to the connector housing via visual inspection.

15. The method of claim 7,
wherein step (f) further includes verifying the positions of the fiber cores relative to the connector housing via optical monitoring of the transmitted power that passes through a mated pair of connectors.

16. The method of claim 7,
wherein step (f) further includes verifying the positions of the fiber cores relative to the connector housing via optical monitoring of the transmitted power from an active device through a connector.

17. A method for providing aligned connectorization for an optical fiber cable containing a multicore fiber, comprising:
   (a) stripping an end portion of the optical cable, so as to create an exposed, bare end of the multicore fiber;
   (b) inserting the exposed end portion of the multicore fiber into a capillary extending longitudinally through a ferrule subassembly of an optical connector,
   wherein the ferrule subassembly comprises a ferrule mounted into a receptacle, and wherein the ferrule subassembly is rotatably mounted into a collar fitting around the ferrule subassembly;

(c) bonding the exposed end of the multicore fiber within the ferrule;
(d) trimming the fiber at the ferrule tip;
(e) polishing the trimmed fiber to produce a convex endface; and
(f) rotating the ferrule subassembly around its longitudinal axis, within the collar, until the fiber cores are in a desired position relative to the collar; and
(g) installing the aligned ferrule subassembly and collar into an optical connector housing, whereby a precise rotational alignment is achieved.

18. The method of claim 17,
wherein in step (g), a precise rotational alignment is achieved with respect to a second multicore fiber mounted into a mating optical connector.

19. The method of claim 17,
wherein in step (g), a precise rotational alignment is achieved with respect to an array of optical devices.

20. The method of claim 17,
wherein step (g) further includes verifying the positions of the cores of the multicore fiber relative to the collar via visual inspection.

21. The method of claim 17,
wherein step (g) further includes verifying the positions of the cores of the multicore fiber relative to the optical connector housing.

22. The method of claim 21,
wherein step (g) further comprises verifying the positions of the cores of the multicore fiber relative to the connector housing via optical monitoring of the transmitted power that passes through a mated pair of connectors.

23. The method of claim 21,
wherein step (g) further comprises verifying the positions of the cores of the multicore fiber relative to the connector housing via optical monitoring of the transmitted power from an active device through a connector.

* * * * *